(12) United States Patent
Shoji et al.

(10) Patent No.: US 12,233,714 B2
(45) Date of Patent: Feb. 25, 2025

(54) INFORMATION PROCESSING APPARATUS, INFORMATION PROCESSING METHOD, AND MOBILE BODY APPARATUS

(71) Applicant: SONY GROUP CORPORATION, Tokyo (JP)

(72) Inventors: Yuki Shoji, Tokyo (JP); Toshiyuki Kimura, Tokyo (JP); Naoto Shimizu, Tokyo (JP); Kentaro Shibukawa, Tokyo (JP); Tetsu Sumii, Tokyo (JP); Teruyoshi Masuda, Tokyo (JP); Osamu Sakurai, Tokyo (JP); So Morimoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 323 days.

(21) Appl. No.: 17/310,946

(22) PCT Filed: Jan. 15, 2020

(86) PCT No.: PCT/JP2020/000974
§ 371 (c)(1),
(2) Date: Sep. 1, 2021

(87) PCT Pub. No.: WO2020/183893
PCT Pub. Date: Sep. 17, 2020

(65) Prior Publication Data
US 2022/0080826 A1   Mar. 17, 2022

(30) Foreign Application Priority Data
Mar. 14, 2019 (JP) ................. 2019-046824

(51) Int. Cl.
*B60K 35/00* (2024.01)
*B60K 35/28* (2024.01)
(Continued)

(52) U.S. Cl.
CPC .............. *B60K 35/00* (2013.01); *B60K 35/28* (2024.01); *B60K 35/29* (2024.01); *B60K 35/60* (2024.01);
(Continued)

(58) Field of Classification Search
CPC ...... G01C 21/26; H04N 7/183; H04N 13/305; H04N 7/18; G08G 1/167; B60K 35/00;
(Continued)

(56) References Cited

U.S. PATENT DOCUMENTS

2006/0022808 A1 * 2/2006 Ito .......................... G08G 1/167
340/576
2009/0261957 A1 * 10/2009 Kido ..................... B60K 35/00
340/435
(Continued)

FOREIGN PATENT DOCUMENTS

CN   106915302 A      7/2017
JP    2516287 B2 *   4/1991   ......... G06F 3/04855
(Continued)

OTHER PUBLICATIONS

International Search Report and Written Opinion of PCT Application No. PCT/JP2020/000974, issued on Mar. 31, 2020, 09 pages of ISRWO.

*Primary Examiner* — Yuri Kan
(74) *Attorney, Agent, or Firm* — CHIP LAW GROUP

(57) ABSTRACT

An information processing apparatus that controls scenery display according to a current position of a mobile body is provided. The information processing apparatus includes a detection unit that detects a region where a predetermined object outside the mobile body appears within a window of the mobile body, a display unit that displays a transmissive region and a non-transmissive region within the window,
(Continued)

and a control unit that controls the display unit based on the detected region. The detection unit detects an appearance place where the object appears in the window, based on a current position of the mobile body, a moving speed and a traveling direction of the mobile body, and position information associated with the object. Thereafter, a transmissive region is displayed in the region where the object appears, or a non-transmissive region that masks a region where the object is absent is displayed in the window.

20 Claims, 24 Drawing Sheets

(51) Int. Cl.
*B60K 35/29* (2024.01)
*B60K 35/60* (2024.01)

(52) U.S. Cl.
CPC .. *B60K 2360/166* (2024.01); *B60K 2360/175* (2024.01); *B60K 2360/1868* (2024.01); *B60K 2360/785* (2024.01)

(58) Field of Classification Search
CPC ......... B60K 35/22; G02F 1/1333; G06T 7/13; G02B 27/0101; B60R 1/00; G07F 17/34; G06F 3/04855
See application file for complete search history.

(56) References Cited

U.S. PATENT DOCUMENTS

| | | | |
|---|---|---|---|
| 2012/0176570 A1* | 7/2012 | Yamazaki | G02F 1/1333 349/110 |
| 2016/0269721 A1* | 9/2016 | Toda | H04N 13/305 |
| 2017/0024006 A1* | 1/2017 | Kwon | G06T 7/13 |
| 2018/0312111 A1* | 11/2018 | Bongwald | B60R 1/00 |
| 2019/0124301 A1* | 4/2019 | Yoshii | H04N 7/183 |
| 2021/0096362 A1* | 4/2021 | Zhang | G02B 27/0101 |

FOREIGN PATENT DOCUMENTS

| | | | | |
|---|---|---|---|---|
| JP | 2004073712 A | * | 3/2004 | ............. G07F 17/34 |
| JP | 2007-052719 A | | 3/2007 | |
| JP | 2012-155320 A | | 8/2012 | |
| JP | 2015-009677 A | | 1/2015 | |
| JP | 2015-104014 A | | 6/2015 | |
| WO | 2017/208719 A1 | | 12/2017 | |

* cited by examiner

INFORMATION PROCESSING APPARATUS, INFORMATION PROCESSING METHOD, AND MOBILE BODY APPARATUS

CROSS REFERENCE TO RELATED APPLICATIONS

This application is a U.S. National Phase of International Patent Application No. PCT/JP2020/000974 filed on Jan. 15, 2020, which claims priority benefit of Japanese Patent Application No. JP 2019-046824 filed in the Japan Patent Office on Mar. 14, 2019. Each of the above-referenced applications is hereby incorporated herein by reference in its entirety.

TECHNICAL FIELD

A technology disclosed in the present description relates to an information processing apparatus, an information processing method, and a mobile body apparatus for processing information chiefly associated with a mobile body.

BACKGROUND ART

A technology which displays various types of guidance information by using a windshield or a head-up display for car driving assistance or other purposes is known (e.g., see PTL 1). By using this technology, an object to note is allowed to be displayed in a conspicuous manner for a driver and an occupant with use of a marker or the like, or guidance information such as description associated with the object is allowed to be displayed while being overlapped on the object.

Further, with advancement of autonomous driving and ADAS (Advanced Driver Assistance System) technologies, the necessity of a constant gaze fixed at outside sceneries by a driver or another occupant through all four-side windows of a vehicle has been decreasing in recent years.

CITATION LIST

Patent Literature

PTL 1

JP 2015-9677A

SUMMARY

Technical Problem

An object of the technology disclosed in the present description is to provide an information processing apparatus, an information processing method, and a mobile body apparatus for controlling scenery display chiefly presented on a mobile body.

Solution to Problem

A first aspect of the technology disclosed in the present description is directed to an information processing apparatus including a detection unit that detects a region where a predetermined object outside a mobile body appears within a window of the mobile body, a display unit that displays a transmissive region and a non-transmissive region within the window, and a control unit that controls the display unit on the basis of a detection result obtained by the detection unit.

The information processing apparatus according to the first aspect further includes a state acquisition unit that acquires state information associated with the mobile body. The state acquisition unit acquires a current position of the mobile body and a moving speed and a traveling direction of the mobile body. The detection unit detects the region where the object appears in the window, on the basis of the current position of the mobile body, the moving speed and the traveling direction of the mobile body, and position information associated with the object. Thereafter, the control unit controls the display unit in such a manner that a transmissive region in the region where the object appears is displayed or a non-transmissive region that masks a region where the object is absent is displayed.

Further, the control unit controls at least either a shape or a size of the transmissive region on the basis of at least either a size of the object appearing in the window or the region where the object appears.

Further, the information processing apparatus according to the first aspect further includes a search unit that searches for the object. The search unit searches for an object of a scenery point appearing in the window on the basis of at least either map information or scenery information that describes information associated with the scenery point.

In addition, the information processing apparatus according the first aspect further includes a generation unit that generates guidance information associated with the object. In this case, the control unit controls the display unit in such a manner that the guidance information is displayed in the non-transmissive region.

A second aspect of the technology disclosed in the present description is directed to an information processing method including a detection step of detecting a region where a predetermined object outside a mobile body appears within a window of the mobile body, a display step of causing a display unit to display a transmissive region and a non-transmissive region within the window, and a control step of controlling the display unit in such a manner that a transmissive region in the region where the object appears is displayed or a non-transmissive region that masks a region where the object is absent is displayed, on the basis of a detection result obtained by the detection step.

A third aspect of the technology disclosed in the present description is directed to a mobile body apparatus including a main unit of a mobile body, the main unit including one or more windows, a detection unit that detects a region where a predetermined object outside the mobile body appears within the window, a display unit that displays a transmissive region and a non-transmissive region within the window, and a control unit that controls the display unit on the basis of a detection result obtained by the detection unit. The control unit controls the display unit in such a manner that a transmissive region in the region where the object appears is displayed or a non-transmissive region that masks a region where the object is absent is displayed.

Advantageous Effects of Invention

Providable according to the technology disclosed in the present description are an information processing apparatus, an information processing method, and a mobile body apparatus each capable of controlling scenery display according to a current position or the like of a mobile body.

Note that advantageous effects included in the present description are presented only by way of example. Advantageous effects to be produced by the technology disclosed in the present description are not limited to these examples.

Further, the technology disclosed in the present description further offers additional advantageous effects as well as the above advantageous effect in some cases.

Further objects, characteristics, and advantages of the technology disclosed in the present description will become apparent in the light of more detailed description based on an embodiment described below and the accompanying drawings.

DESCRIPTION OF EMBODIMENT

An embodiment of the technology disclosed in the present description will hereinafter be described in detail with reference to the drawings.

A. Configuration of Vehicle Control System

Figure 1:
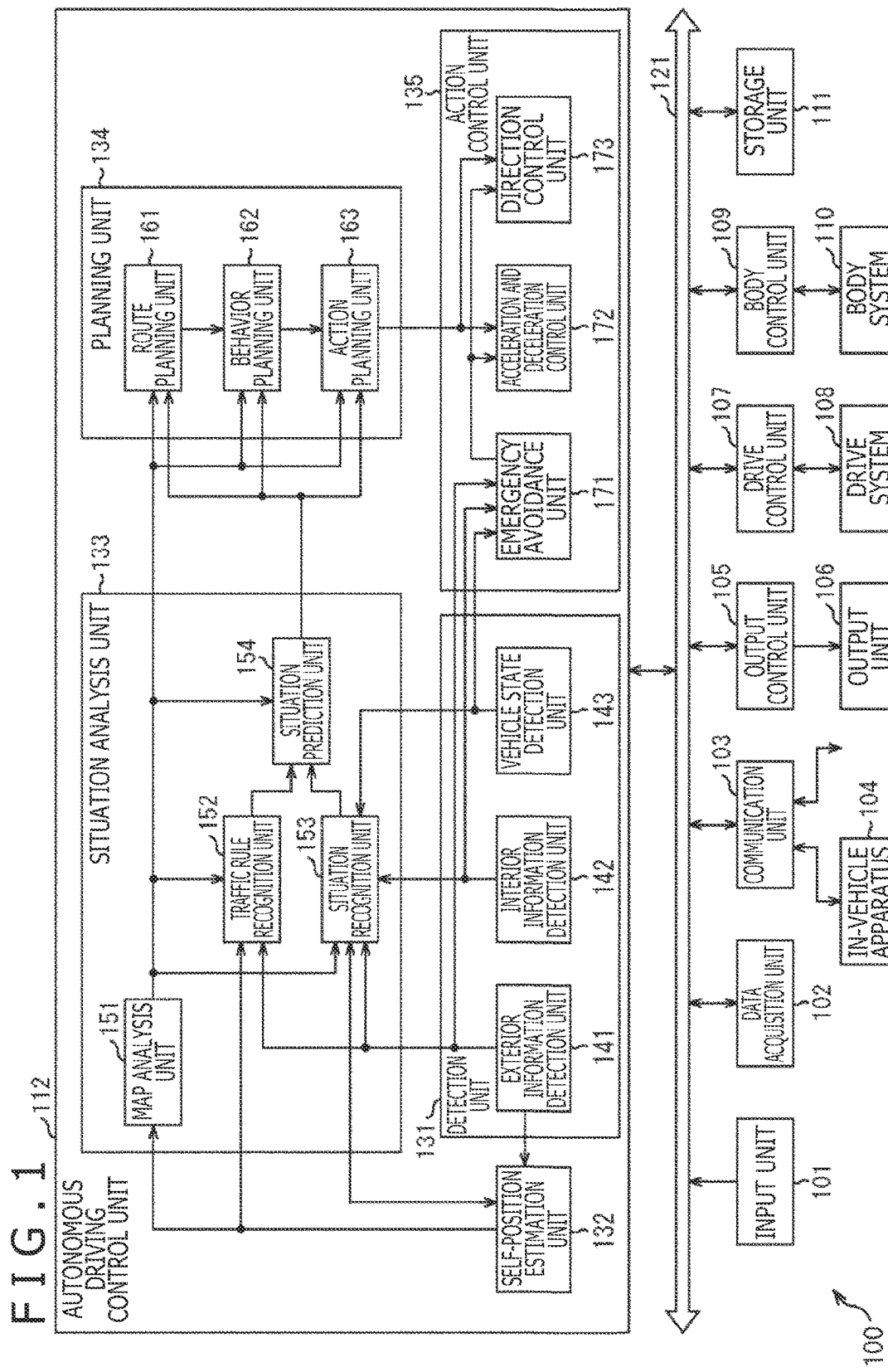
FIG. 1 is a block diagram depicting a configuration example of a schematic function of a vehicle control system 100.

FIG. 1 is a block diagram depicting a configuration example of a general function of a vehicle control system 100 which is an example of a mobile body control system to which the present technology is applicable.

Note that a vehicle on which the vehicle control system 100 is provided will be referred to as an own vehicle or an own car in a case of the necessity of distinction of this vehicle from other vehicles.

The vehicle control system 100 includes an input unit 101, a data acquisition unit 102, a communication unit 103, an in-vehicle apparatus 104, an output control unit 105, an output unit 106, a drive control unit 107, a drive system 108, a body control unit 109, a body system 110, a storage unit 111, and an autonomous driving control unit 112. The input unit 101, the data acquisition unit 102, the communication unit 103, the output control unit 105, the drive control unit 107, the body control unit 109, the storage unit 111, and the autonomous driving control unit 112 are connected to one another via a communication network 121. For example, the communication network 121 includes an in-vehicle communication network, a bus, or the like in conformity with any standard such as a CAN (Controller Area Network), a LIN (Local Interconnect Network), a LAN (Local Area Network), and FlexRay (registered trademark). Note that the respective units of the vehicle control system 100 are directly connected to one another without using the communication network 121 in some cases.

In addition, it is assumed that description of the communication network 121 will hereinafter be omitted in a case where the respective units of the vehicle control system 100 communicate with one another via the communication network 121. For example, in a case where the input unit 101 and the autonomous driving control unit 112 communicate with one another via the communication network 121, this communication will simply be described as communication between the input unit 101 and the autonomous driving control unit 112.

The input unit 101 includes a device used by a person on board to input various types of data, instructions, and the like. For example, the input unit 101 includes an operation device such as a touch panel, a button, a microphone, a switch, and a lever, an operation device capable of inputting voices, gestures, and the like by using a method other than a manual operation, or other devices. Further, for example, the input unit 101 may be a remote controller using infrared light or other radio waves, or an external connection apparatus such as a mobile apparatus and a wearable apparatus handling operation of the vehicle control system 100. The input unit 101 generates input signals on the basis of data, instructions, or the like input from the person on board, and supplies the generated input signals to the respective units of the vehicle control system 100.

The data acquisition unit 102 includes various types of sensors for acquiring data used for processing by the vehicle control system 100, for example, and supplies acquired data to the respective units of the vehicle control system 100.

For example, the data acquisition unit 102 includes various types of sensors for detecting a state or the like of the own vehicle. Specifically, for example, the data acquisition unit 102 includes a gyro sensor, an acceleration sensor, an inertial measurement unit (IMU), a sensor for detecting an operation amount of an acceleration pedal, an operation amount of a brake pedal, a steering angle of a steering wheel, an engine speed, a motor speed, a rotation speed of wheels, and the like.

Further, for example, the data acquisition unit 102 includes various types of sensors for detecting external information associated with the own vehicle. Specifically, for example, the data acquisition unit 102 includes an imaging device such as a ToF (Time Of Flight) camera, a stereo camera, a monocular camera, an infrared camera, and other types of cameras. Further, for example, the data acquisition unit 102 includes an environmental sensor for detecting weather, meteorology, or the like, and an ambient information detection sensor for detecting an object around the own vehicle. For example, the environmental sensor includes a raindrop sensor, a fog sensor, a sunlight sensor, a snow sensor, or the like. For example, the ambient information detection sensor includes an ultrasonic sensor, a radar, a LiDAR (Light Detection and Ranging, Laser Imaging Detection and Ranging), a sonar, or the like.

Further, for example, the data acquisition unit 102 includes various types of sensors for detecting a current position of the own vehicle. Specifically, for example, the data acquisition unit 102 includes a GNSS (Global Navigation Satellite System) receiver for receiving GNSS signals from GNSS satellites, and the like.

In addition, for example, the data acquisition unit 102 includes various types of sensors for detecting information inside the vehicle. Specifically, for example, the data acquisition unit 102 includes an imaging device for imaging a driver, a biosensor for detecting biological information associated with the driver, a microphone for collecting voices in the vehicle interior, and the like. For example, the biosensor is provided on a seat surface, the steering wheel, or the like to detect biological information associated with a person on board sitting on a seat or the driver holding the steering wheel.

The communication unit 103 communicates with the in-vehicle apparatus 104 and various apparatuses outside the vehicle, servers, base stations, and the like, and transmits data supplied from the respective units of the vehicle control system 100 to supply received data to the respective units of the vehicle control system 100. Note that a communication protocol supported by the communication unit 103 is not limited to any particular protocol, and that the communication unit 103 is allowed to support a plurality of types of communication protocols.

For example, the communication unit 103 wirelessly communicates with the in-vehicle apparatus 104 by using a wireless LAN, Bluetooth (registered trademark), NFC (Near Field Communication), a WUSB (Wireless USB), or the like. Further, for example, the communication unit 103 communicates with the in-vehicle apparatus 104 by wire via a not-depicted connection terminal (and a cable if necessary) by using a USB (Universal Serial Bus), HDMI (High-Definition Multimedia Interface), MHL (Mobile High-definition Link), or the like.

Further, for example, the communication unit 103 communicates with an apparatus (e.g., an application server or a control server) existing on an external network (e.g., the Internet, a cloud network, and a proprietary network of a business operator) via a base station or an access point. In addition, for example, the communication unit 103 communicates with a terminal existing near the own vehicle (e.g., a terminal carried by a pedestrian or equipped in a store, or an MTC (Machine Type Communication) terminal) by using a P2P (Peer To Peer) technology. Further, for example, the communication unit 103 performs V2X communication such as vehicle to vehicle (Vehicle to Vehicle) communication, vehicle to infrastructure (Vehicle to Infrastructure) communication, vehicle to home (Vehicle to Home) communication, and vehicle to pedestrian (Vehicle to Pedestrian) communication. Further, for example, the communication unit 103 includes a beacon reception unit to receive radio waves or electromagnetic waves transmitted from a wireless station or the like installed on a road and to acquire information such as a current position, a traffic jam, a traffic restriction, and a required length of time.

For example, the in-vehicle apparatus 104 includes a mobile apparatus or a wearable apparatus carried by the person on board, an information apparatus brought into or attached to the own vehicle, a navigation device which searches for a route to any destination, and the like.

The output control unit 105 controls output of various types of information to the person having boarded the own vehicle or to the outside of the vehicle. For example, the output control unit 105 generates an output signal containing at least either visual information (e.g., image data) or auditory information (e.g., audio data), and supplies the generated output signal to the output unit 106 to control output of the visual information and the auditory information from the output unit 106. Specifically, for example, the output control unit 105 generates a bird's eye image, a panorama image, or the like by synthesizing image data captured by different imaging devices of the data acquisition unit 102, and supplies output signals containing the generated image to the output unit 106. Further, for example, the output control unit 105 generates audio data containing a warning sound, a warning message, or the like for a danger such as a collision, a contact, and entrance into a dangerous zone, and supplies output signals containing the generated audio data to the output unit 106.

The output unit 106 includes a device capable of outputting visual information or auditory information to the person having boarded the own vehicle or to the outside of the vehicle. For example, the output unit 106 includes a display device, an instrument panel, an audio speaker, a headphone, a wearable device such as a glass-type display worn by the person on board, a projector, a lamp, or the like. The display device included in the output unit 106 may be a device displaying visual information within a visual field of the driver, such as a head-up display, a transmissive display, and a device having an AR (Augmented Reality) display function, other than the device having an ordinary display.

The drive control unit 107 controls the drive system 108 by generating various types of control signals and supplying the control signals to the drive system 108. Further, the drive control unit 107 supplies control signals to respective units other than the drive system 108 to give a notification of a control state of the drive system 108 as necessary, for example.

The drive system 108 includes various types of devices associated with a drive system of the own vehicle. For example, the drive system 108 includes a driving force generation device for generating a driving force for driving an internal combustion engine, a driving motor, or the like, a driving force transmission mechanism for transmitting a driving force to wheels, a steering mechanism for adjusting a steering angle, a braking device for generating a braking force, ABS (Antilock Brake System), ESC (Electronic Stability Control), an electric power steering device, and the like.

The body control unit 109 generates various types of control signals and supplies the control signals to the body system 110 to control the body system 110. Further, the body control unit 109 supplies control signals to respective units other than the body system 110 to give a notification of a control state of the body system 110 as necessary, for example.

The body system 110 includes various types of devices associated with a body system equipped on a vehicle body. For example, the body system 110 includes a keyless entry system, a smart key system, a power window device, a power seat, a steering wheel, an air conditioning device, various types of lamps (e.g., head lamps, back lamps, brake lamps, direction indicators, and fog lamps), and others.

For example, the storage unit 111 includes a magnetic storage device, a semiconductor storage device, an optical storage device, a magneto-optical storage device, or the like, such as a ROM (Read Only Memory), a RAM (Random Access Memory), or an HDD (Hard Disc Drive). The storage unit 111 stores various programs, data, or the like used by the respective units of the vehicle control system 100. For example, the storage unit 111 stores such map data as a three-dimensional high-accuracy map such as a dynamic map, a global map having accuracy lower than that of the high-accuracy map but covering a wide area, and a local map containing information associated with surroundings of the own vehicle.

The autonomous driving control unit 112 performs control associated with autonomous driving, such as autonomous traveling and driving assistance. Specifically, for example, the autonomous driving control unit 112 performs cooperative control for a purpose of achieving functions of an ADAS (Advanced Driver Assistance System) including avoidance of a collision or easing of a shock of the own vehicle, following traveling based on a distance between vehicles, constant vehicle speed traveling, collision warning for the own vehicle, a lane departure warning for the own vehicle, or the like. Further, for example, the autonomous driving control unit 112 performs cooperative control for a purpose of achieving autonomous driving for allowing autonomous traveling without the necessity of operation by the driver, for example. The autonomous driving control unit 112 includes a detection unit 131, a self-position estimation unit 132, a situation analysis unit 133, a planning unit 134, and an action control unit 135.

The detection unit 131 detects various types of information necessary for autonomous driving control. The detection unit 131 includes an exterior information detection unit 141, an interior information detection unit 142, and a vehicle state detection unit 143.

The exterior information detection unit 141 performs a detection process for detecting information outside the own vehicle on the basis of data or signals received from the respective units of the vehicle control system 100. For example, the exterior information detection unit 141 performs a detection process, a recognition process, and a tracking process for detecting, recognizing, and tracking a body around the own vehicle, and a detection process for detecting a distance to the body. Examples of the body corresponding to a detection target include a vehicle, a human, an obstacle, a structure, a road, a traffic light, a traffic sign, and a road marking. Further, for example, the exterior information detection unit 141 performs a detection process for detecting an environment around the own vehicle. Examples of the environment around the own vehicle corresponding to a detection target include weather, temperature, humidity, brightness, and a road surface state. The exterior information detection unit 141 supplies data indicating a result of the detection process to the self-position estimation unit 132, a map analysis unit 151, a traffic rule recognition unit 152, and a situation recognition unit 153 of the situation analysis unit 133, an emergency avoidance unit 171 of the action control unit 135, and others.

The interior information detection unit 142 performs a detection process for detecting information inside the vehicle on the basis of data or signals received from the respective units of the vehicle control system 100. For example, the interior information detection unit 142 performs an authentication process and a recognition process for authenticating and recognizing the driver, a detection process for detecting a state of the driver, a detection process for detecting the person on board, a detection process for detecting an environment inside the vehicle, and the like. Examples of the state of the driver corresponding to a detection target include a physical condition, a degree of alertness, a degree of concentration, a degree of fatigue, and a visual line direction. Examples of the environment inside the vehicle corresponding to a detection target include a temperature, humidity, brightness, and a smell. The interior information detection unit 142 supplies data indicating a result of the detection process to the situation recognition unit 153 of the situation analysis unit 133, the emergency avoidance unit 171 of the action control unit 135, and others.

The vehicle state detection unit 143 performs a detection process for detecting a state of the own vehicle on the basis of data or signals received from the respective units of the vehicle control system 100. Examples of the state of the own vehicle corresponding to a detection target include a speed, an acceleration, a steering angle, the presence or absence and details of abnormality, a state of driving operation, a position and an inclination of a power seat, a state of a door lock, and states of other in-vehicle apparatuses. The vehicle state detection unit 143 supplies data indicating a result of the detection process to the situation recognition unit 153 of the situation analysis unit 133, the emergency avoidance unit 171 of the action control unit 135, and others.

The self-position estimation unit 132 performs an estimation process for estimating a position, a posture, and the like of the own vehicle on the basis of data or signals received from the respective units of the vehicle control system 100, such as the exterior information detection unit 141 and the situation recognition unit 153 of the situation analysis unit 133. Further, the self-position estimation unit 132 generates a local map used for estimation of the self-position (hereinafter referred to as a self-position estimation map) as necessary. For example, the self-position estimation map is a high-accuracy map using a technology such as SLAM (Simultaneous Localization and Mapping). The self-position estimation unit 132 supplies data indicating a result of the estimation process to the map analysis unit 151, the traffic rule recognition unit 152, and the situation recognition unit 153 of the situation analysis unit 133 and others. Further, the self-position estimation unit 132 stores the self-position estimation map in the storage unit 111.

The situation analysis unit 133 performs an analysis process for analyzing situations of the own vehicle and surroundings. The situation analysis unit 133 includes the map analysis unit 151, the traffic rule recognition unit 152, the situation recognition unit 153, and a situation prediction unit 154.

The map analysis unit 151 performs an analysis process for analyzing various types of maps stored in the storage unit 111 by using data or signals received from the respective units of the vehicle control system 100, such as the self-position estimation unit 132 and the exterior information detection unit 141, as necessary, and constructs a map containing information necessary for an autonomous driving process. The map analysis unit 151 supplies the constructed map to the traffic rule recognition unit 152, the situation recognition unit 153, and the situation prediction unit 154, and further to a route planning unit 161, a behavior planning unit 162, and an action planning unit 163 of the planning unit 134, and others.

The traffic rule recognition unit 152 performs a recognition process for recognizing a traffic rule around the own vehicle on the basis of data or signals received from the respective units of the vehicle control system 100, such as the self-position estimation unit 132, the exterior information detection unit 141, and the map analysis unit 151. For example, a position and a state of a signal around the own vehicle, details of a traffic restriction around the vehicle, a travelable lane, and the like are recognized by the recognition process. The traffic rule recognition unit 152 supplies data indicating a result of the recognition process to the situation prediction unit 154 and others.

The situation recognition unit 153 performs a recognition process for recognizing a situation associated with the own vehicle on the basis of data or signals received from the respective units of the vehicle control system 100, such as the self-position estimation unit 132, the exterior information detection unit 141, the interior information detection unit 142, the vehicle state detection unit 143, and the map analysis unit 151. For example, the situation recognition unit 153 performs a recognition process for recognizing a situation of the own vehicle, a situation around the own vehicle, a situation of the driver of the own vehicle, and the like. Further, the situation recognition unit 153 generates a local map used for recognition of the situation around the own vehicle (hereinafter referred to as situation recognition map) as necessary. For example, the situation recognition map is an occupancy grid map (Occupancy Grid Map).

Examples of the situation of the own vehicle corresponding to a recognition target include a position, a posture, and movement (e.g., speed, acceleration, and moving direction) of the own vehicle and the presence or absence and details of abnormality. Examples of the situation around the own vehicle corresponding to a recognition target include a type and a position of a surrounding still body, a type, a position, and movement (e.g., speed, acceleration, and moving direction) of a surrounding dynamic body, a configuration of a surrounding road and a road surface state, ambient weather, ambient temperature, ambient humidity, and ambient brightness. Examples of the state of the driver corresponding to a detection target include a physical condition, a degree of alertness, a degree of concentration, a degree of fatigue, movement of a visual line, and a driving operation.

The situation recognition unit 153 supplies data indicating a result of the recognition process (including a situation recognition map as necessary) to the self-position estimation unit 132, the situation prediction unit 154, and others. Further, the situation recognition unit 153 stores the situation recognition map in the storage unit 111.

The situation prediction unit 154 performs a prediction process for predicting a situation associated with the own vehicle on the basis of data or signals received from the respective units of the vehicle control system 100, such as the map analysis unit 151, the traffic rule recognition unit 152, and the situation recognition unit 153. For example, the situation prediction unit 154 performs a prediction process for predicting a situation of the own vehicle, a situation around the own vehicle, a situation of the driver, and the like.

Examples of the situation of the own vehicle corresponding to a prediction target include a behavior of the own vehicle, occurrence of abnormality, and a travelable distance. Examples of the situation around the own vehicle corresponding to a prediction target include a behavior of a dynamic body around the own vehicle, a state change of a signal, and a change of an environment such as weather. Examples of the situation of the driver corresponding to a prediction target include a behavior and a physical condition of the driver.

The situation prediction unit 154 supplies data indicating a result of the prediction process to the route planning unit 161, the behavior planning unit 162, and the action planning unit 163 of the planning unit 134, and others, together with data received from the traffic rule recognition unit 152 and the situation recognition unit 153.

The route planning unit 161 plans a route to a destination on the basis of data or signals received from the respective units of the vehicle control system 100, such as the map analysis unit 151 and the situation prediction unit 154. For example, the route planning unit 161 sets a route to a designated destination from a current position on the basis of a global map. Further, for example, the route planning unit 161 changes the route as appropriate on the basis of a situation such as a traffic jam, an accident, a traffic restriction, and construction, a physical condition of the driver, and the like. The route planning unit 161 supplies data indicating the planned route to the behavior planning unit 162 and others.

The behavior planning unit 162 plans a behavior of the own vehicle for safe traveling of the route planned by the route planning unit 161 within a planned period on the basis of data or signals received from the respective units of the vehicle control system 100, such as the map analysis unit 151 and the situation prediction unit 154. For example, the behavior planning unit 162 plans a departure, a stop, a traveling direction (e.g., forward movement, backward movement, left turn, right turn, and direction change), a traveling lane, a traveling speed, passing, and the like. The behavior planning unit 162 supplies data indicating the planned behavior of the own vehicle to the action planning unit 163 and others.

The action planning unit 163 plans an action of the own vehicle for achieving the behavior planned by the behavior planning unit 162 on the basis of data or signals received from the respective units of the vehicle control system 100, such as the map analysis unit 151 and the situation prediction unit 154. For example, the action planning unit 163 plans acceleration, deceleration, a traveling track, and the like. The action planning unit 163 supplies data indicating the planned action of the own vehicle to an acceleration and deceleration control unit 172 and a direction control unit 173 of the action control unit 135, and others.

The action control unit 135 controls an action of the own vehicle. The action control unit 135 includes the emergency avoidance unit 171, the acceleration and deceleration control unit 172, and the direction control unit 173.

The emergency avoidance unit 171 performs a detection process for detecting an emergency, such as a collision, a contact, entrance into a dangerous zone, abnormality of the driver, and abnormality of the vehicle, on the basis of a detection result obtained by the exterior information detection unit 141, the interior information detection unit 142, and the vehicle state detection unit 143. In a case of detection of an emergency, the emergency avoidance unit 171 plans an action of the own vehicle for avoiding the emergency, such as a sudden stop and a sharp turn. The emergency avoidance unit 171 supplies data indicating the planned action of the own vehicle to the acceleration and deceleration control unit 172, the direction control unit 173, and others.

The acceleration and deceleration control unit 172 performs acceleration and deceleration control for achieving the action of the own vehicle planned by the action planning unit 163 or the emergency avoidance unit 171. For example, the acceleration and deceleration control unit 172 calculates a control target value of a driving force generation device or a braking device for achieving a planned acceleration, a planned deceleration, or a planned sudden stop, and supplies a control command indicating a calculated control target value to the drive control unit 107.

The direction control unit 173 performs direction control for achieving the action of the own vehicle planned by the action planning unit 163 or the emergency avoidance unit 171. For example, the direction control unit 173 calculates a control target value of a steering mechanism for achieving a traveling track or a sharp turn planned by the action planning unit 163 or the emergency avoidance unit 171, and supplies a control command indicating the calculated control target value to the drive control unit 107.

B. Display Control by Vehicle

Figure 2:
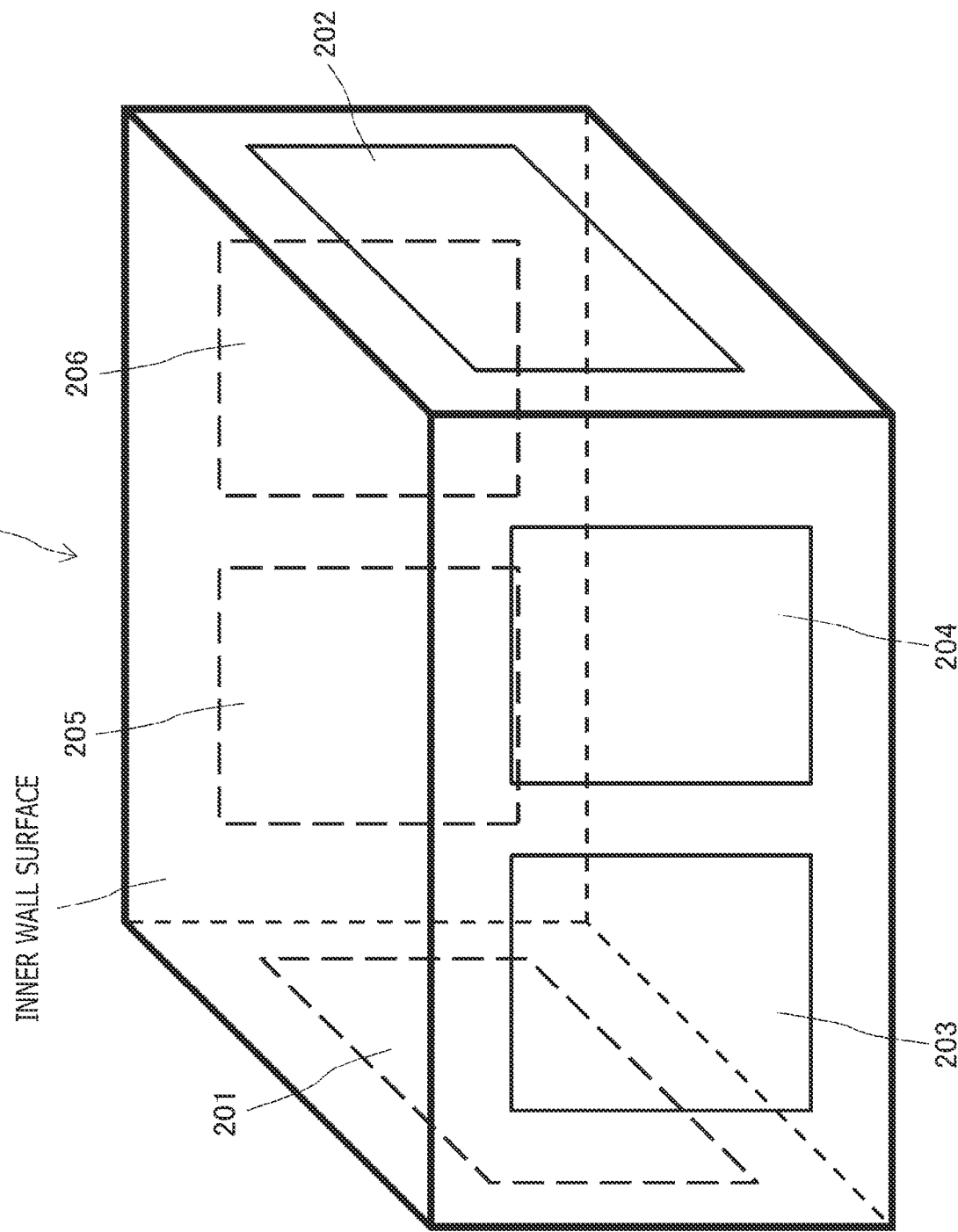
FIG. 2 is a diagram schematically depicting a structure of a vehicle interior 200 of a vehicle.

FIG. 2 schematically depicts a structure of a vehicle interior 200 of the vehicle. Note that a vehicle interior of a passenger car having four doors is assumed in the figure. Wall surfaces on the four sides of the vehicle interior 200 include a windshield 201, a rear window 202, and side windows 203 to 206 provided for respective seats (driver's seat, passenger seat, and left and right rear seats). Note that the vehicle includes a not-depicted sunroof in some cases.

According to the present embodiment, it is assumed that a device capable of switching between a transmissive state and a non-transmissive state, such as a liquid crystal shutter, or capable of gradually or successively switching transmittance is attached to at least a part of the windows 201 to 206 (preferably each of the windows 201 to 206). Further, it is not assumed that switching between the transmissive state and the non-transmissive state or switching of the transmittance is uniformly achieved throughout the one entire window frame, but is assumed that the transmissive state and the non-transmissive state or switching of the transmittance is partially achievable for each region. Specifically, a liquid crystal shutter partially drivable for each grid of a predetermined size is attached to each of the windows 201 to 206.

Each of the windows 201 to 206 of the vehicle is constituted not by transparent glass or the like, but by a combination of a flat display such as an LED (Loght Emittinf Diode) and an OLED (Organic Light Emitting Diode) and an in-vehicle camera each disposed on a window frame. A view through each of the windows 201 to 206 may be a video see-through image presented on the flat display. In such a case, the transmissive state may be considered as a state where a video see-through image is displayed, and the non-transmissive state may be considered as a state where a video see-through image is not displayed (or is replaced with another image).

In a case of a car to which autonomous driving or ADAS is applied, the driver or another occupant is not required to constantly gaze at an outside scenery through the windows of the four faces of the vehicle. Accordingly, even if some or all of the windows 201 to 206 is switched to the non-transmissive state, no problem is particularly caused in view of safe traveling of the vehicle.

Only a thing desired to be displayed is highlighted by switching only a partial region of the windows 201 to 206 to the transmissive state and performing a scenery masking process in such a manner as to limit a visual field. As a result, the visual line of the person on board is guidable to an object located outside the vehicle and visible through the transmissive region of the windows 201 to 206.

For example, the visual line of the person on board is guidable to an object outside the vehicle, such as a scenery point, by forming a transmissive region in a part of the windows 201 to 206 such that the scenery point enters the visual field of the person on board when the traveling vehicle approaches the scenery point.

Needless to say, the person on board is capable of visually recognizing the scenery point if transmittance is set to 100% for the entire region of the windows 201 to 206. In this case, however, other various things enter the visual field. Accordingly, time and effort are required to search for the scenery point in the wide visual field. The vehicle passes through the scenery point while the person on board is searching for the scenery point. In this case, the person on board may miss the scenery point.

Further, by switching a part or the entire region of the windows 201 to 206 to the non-transmissive state in a manner opposite to the above, a scenery viewed enough by the person on board, a thing uncomfortable for the person on board when viewed (e.g., an obstacle blocking a scenery), or the like can be made invisible for the person on board to maintain comfort of the vehicle interior.

In short, the vehicle interior 200 which includes the windows 201 to 206 each capable of switching between the transmissive state and the non-transmissive state or switching transmittance as depicted in FIG. 2 is adoptable as a display device capable of presenting information such as visual line guidance. Further, an operation of the display device of such a type is controllable, under the control by the vehicle control system 100 depicted in FIG. 1.

An operation principle for controlling visual line guidance or scenery display with use of the vehicle interior 200 of the vehicle will be described with reference to the drawings.

Figure 3:
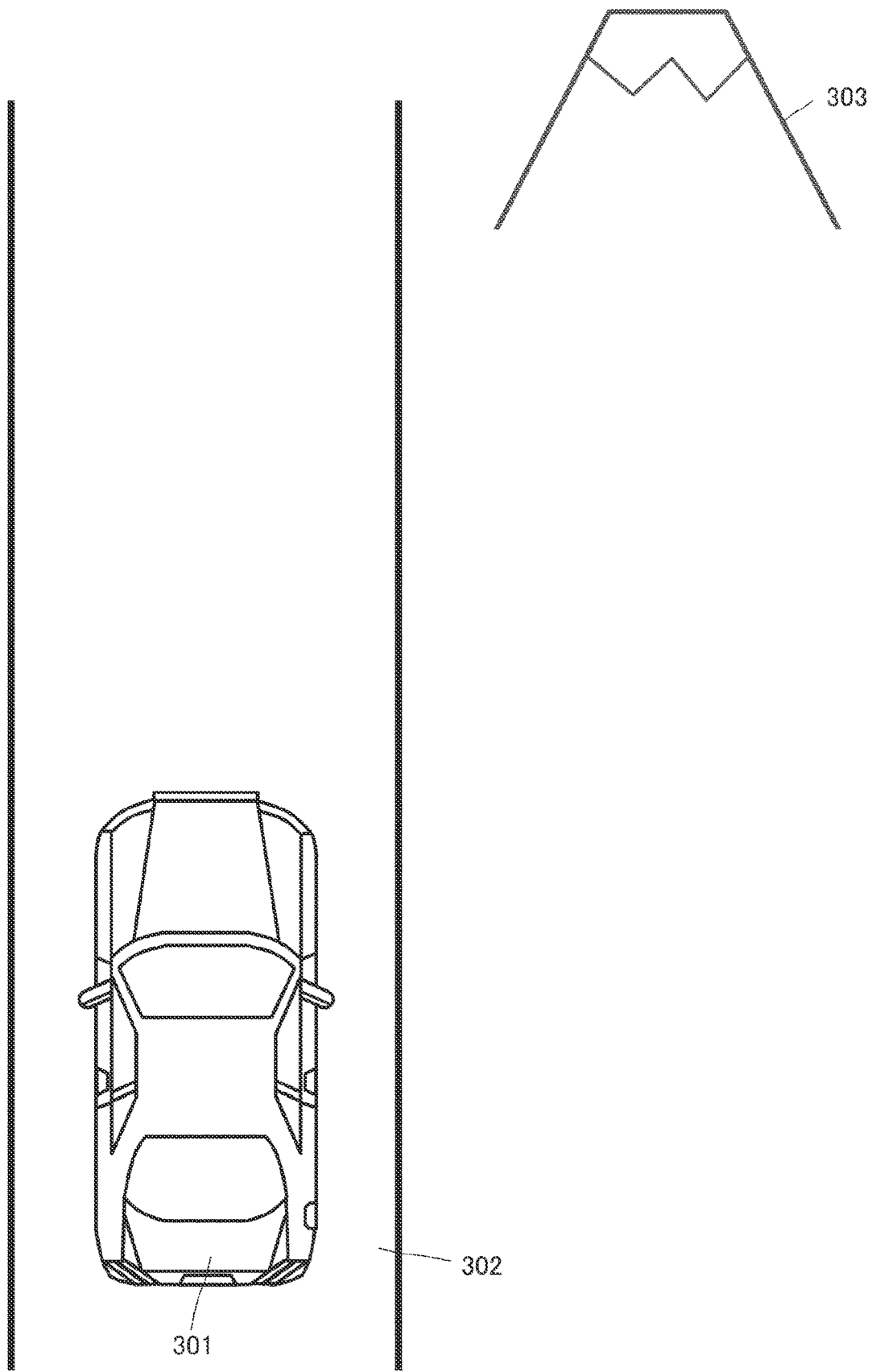
FIG. 3 is a diagram for explaining an operation principle for controlling visual line guidance or scenery display.

FIG. 3 depicts a state where an object 303 corresponding to a superb view point appears in a traveling direction while a vehicle 301 is traveling straight at a constant speed on a straight road 302.

Figure 4:
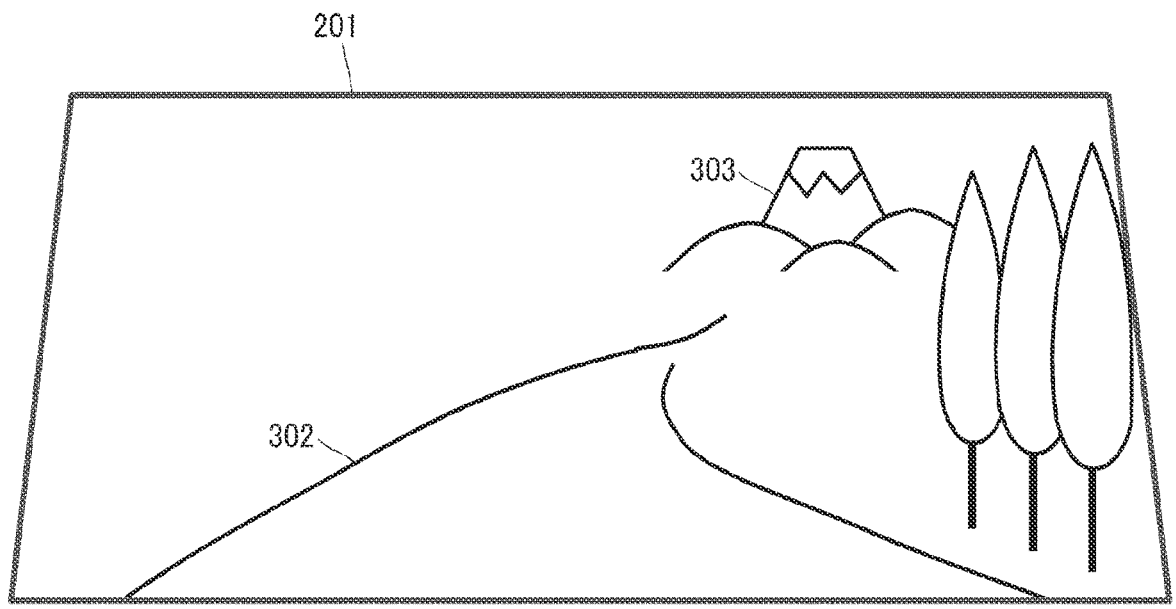
FIG. 4 is another diagram for explaining the operation principle for controlling visual line guidance or scenery display.

In such a case, the object 303 is allowed to enter a visual field range of the person on board through the windshield 201 as depicted in FIG. 4 by bringing the entire windshield 201 into the transmissive state. Accordingly, the object 303 is observable by the person on board.

Figure 5:
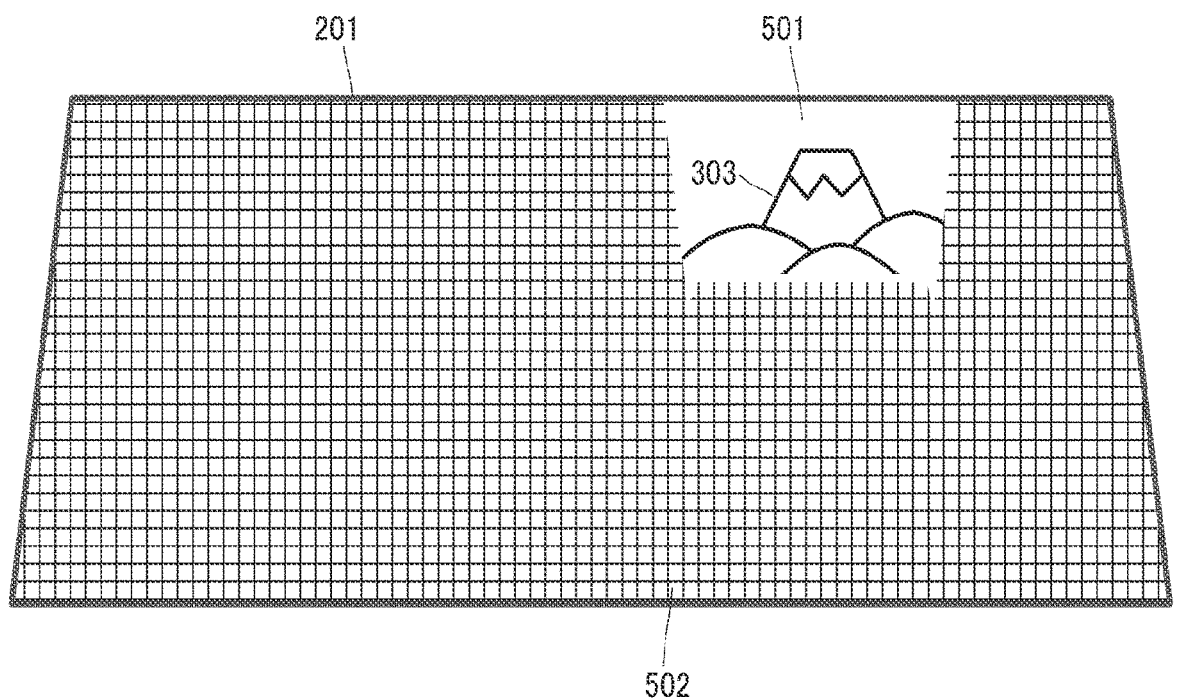
FIG. 5 is still another diagram for explaining the operation principle for controlling visual line guidance or scenery display.

On the other hand, the visual line of the person on board is automatically guided toward a transmissive region 501 to find the object 303, by bringing not the entire windshield 201 but only a partial region 501 where the object 303 is visible into the transmissive state and a remaining region 502 into the non-transmissive state as depicted in FIG. 5. In other words, the person on board is capable of searching for the scenery point in the wide visual field without costing time and effort. Note that the non-transmissive state in the region 502 is not limited to a completely light shielded state, and includes a state where a scenery is visible to a certain extent even at lowered transmittance (the same applies hereinafter).

If the target object 303 is a scenery point such as a POI (Point OF Interest), the location of the object 303 can be checked on the basis of map information used by car navigation or the like. Needless to say, any scenery information describing the scenery point other than the map information may be referred to as well. In addition, a current position and a traveling direction of the vehicle are detectable by using GNSS signals (described above) or the like. Accordingly, the condition that the vehicle 301 is approaching the object 303 and from which of the windows 201 to 206 of the vehicle interior 200 and from which place in the window the object 303 is visible can be calculated and obtained on the basis of the detected current position and traveling direction of the vehicle.

Figure 6:
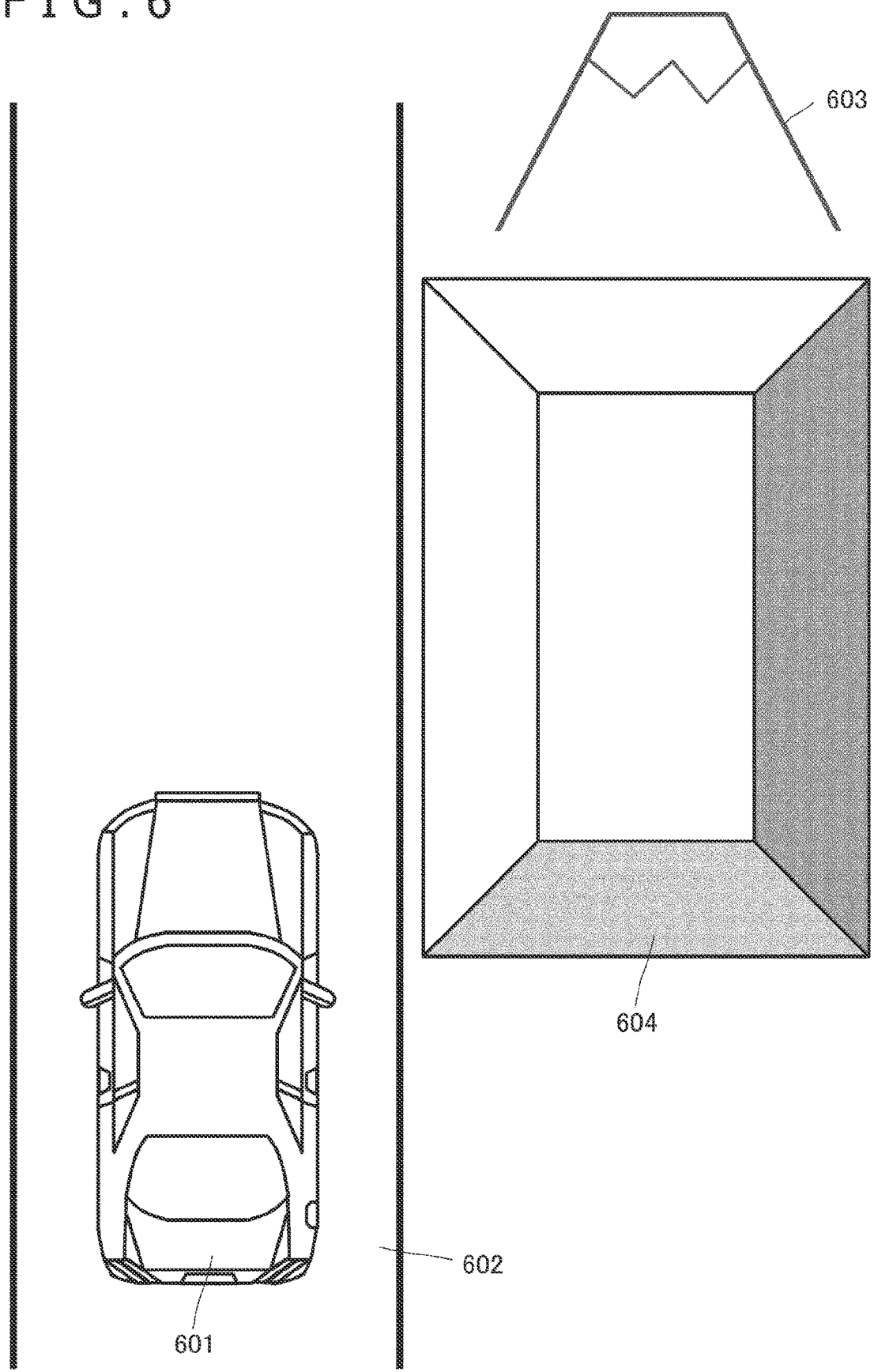
FIG. 6 is yet another diagram for explaining the operation principle for controlling visual line guidance or scenery display.

Further, FIG. 6 depicts a state where an object 603 corresponding to a superb view point appears in a traveling direction while a vehicle 601 is traveling straight at a constant speed on a straight road 602. However, an obstacle 604 is present between the vehicle 601 and the object 603. For example, the obstacle 604 is a large-sized vehicle such as a truck and a trailer, a structure such as a building, a roadside tree, or a signboard provided on a road shoulder.

In such a case, the visual field is blocked by the obstacle 604 even when the windshield 201 is in the transmissive state. Accordingly, the object 603 is invisible for the person on board. Further, when the windshield 201 is switched to the transmissive state, the person on board is not allowed to view a beautiful scenery, and is only made to feel uncomfortable by the obstacle 604 entering the visual line as an unsightly object.

If the obstacle is a structure, the location of the obstacle can be checked on the basis of the map information. Further, the obstacle such as a surrounding vehicle, a roadside tree, and a signboard is recognizable on the basis of sensor information obtained by an in-vehicle external recognition sensor such as an in-vehicle camera and a radar. It is thus determinable whether the obstacle 604 is present between the vehicle 601 and the object 303 on the basis of the location of the object 603 obtained by the map information or the like, the current position of the vehicle 601, and the recognition result of the obstacle 604. In a case of a determination that the object 603 is less visible by the presence of the obstacle 604, visual line guidance is given up, and the windshield 201 is maintained in the non-transmissive state. The person on board is not allowed to view the scenery point, but simultaneously not made uncomfortable by the obstacle 604 also invisible.

Figure 7:
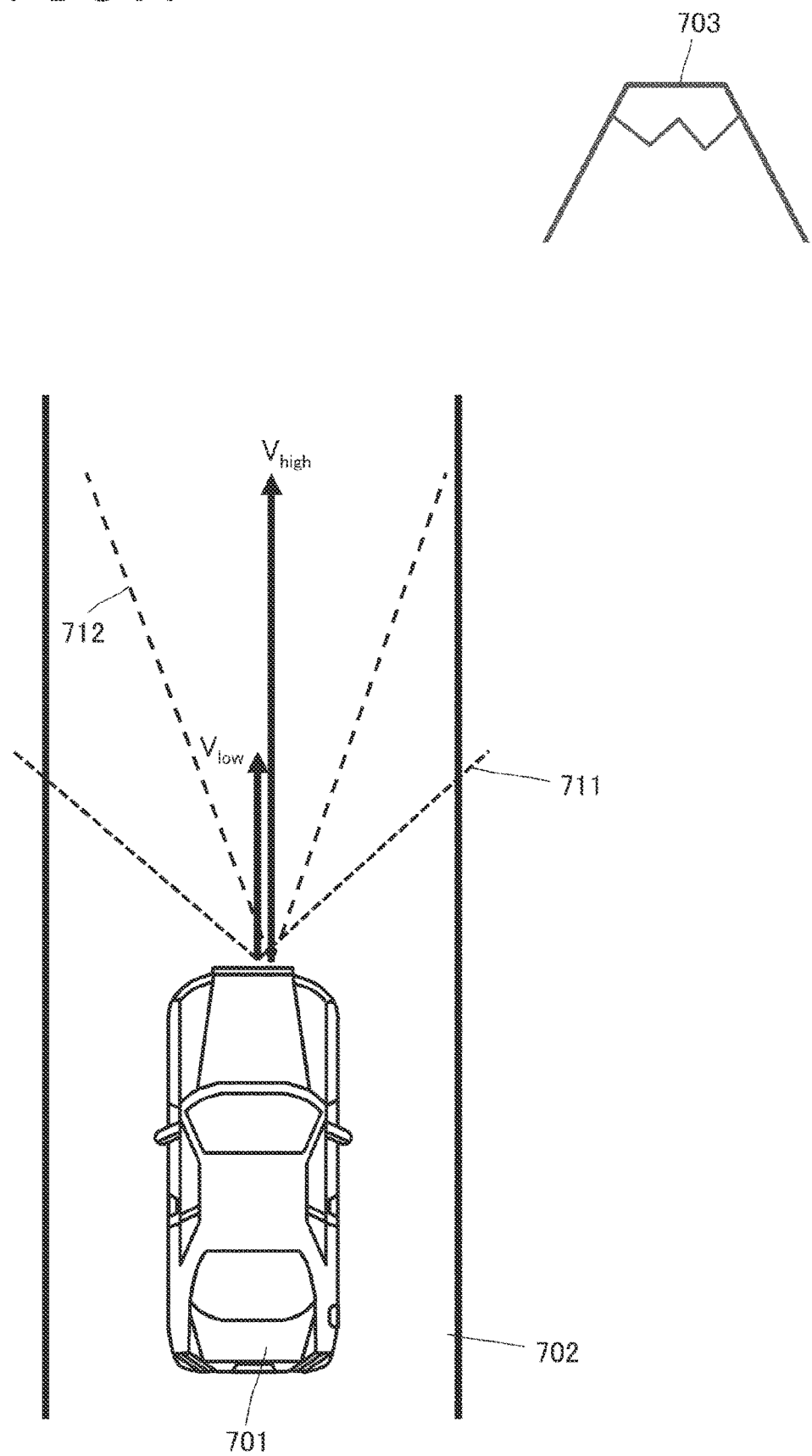
FIG. 7 is a further diagram for explaining the operation principle for controlling visual line guidance or scenery display.

Further, FIG. 7 schematically depicts a relation between a vehicle speed of a vehicle 701 and the visual field of the person on board. It is known that a visual field of a human changes according to a moving speed. A visual field of a human is wide during a low moving speed, but becomes narrower with an increase in the moving speed. FIG. 7 depicts a viewing angle during a low moving speed and a viewing angle during a high moving speed to which reference numbers 711 and 712 are given, respectively.

Accordingly, in a case where the vehicle 701 travels on a road 702 while changing a vehicle speed, the vehicle 701 controls the transmissive state or transmittance of the windows 201 to 206 according to whether or not an object 703 of a scenery point is located within a range of a viewing angle corresponding to the vehicle speed at the time when the vehicle 701 approaches the object 703.

The vehicle speed and the steering angle of the vehicle 701 are detectable by the vehicle state detection unit 143. The range of the viewing angle corresponding to the vehicle speed can be calculated in the traveling direction of the vehicle 701 on the basis of a detection result of the vehicle speed and the steering angle. Thereafter, it is determined whether the object 703 whose location has been specified on the basis of the map information or the like is contained in the range of the viewing angle corresponding to the vehicle speed at the current position of the vehicle 701.

While the vehicle 701 is traveling at a low speed $V_{low}$, the object 703 is present within the range of the viewing angle 711. Accordingly, a partial region where the object 703 is visible in the windshield 201 is brought into the transmissive state to guide the visual line of the person on board to the object 703.

On the other hand, while the vehicle 701 is traveling at a high speed $V_{high}$, the object 703 is located out of the range of the viewing angle 712. In such a case, the visual line of the person on board is not guided. Accordingly, the windshield 201 is not switched to the transmissive state even at the event that the vehicle 701 approaches the object 703.

Further, the visual field range viewed through the windshield 201 also changes according to a shape of a road such as a curve and a slope as well as the vehicle speed. For a curved road, an object not shifting in the up-down direction and the left-right direction is preferably selected as an object to which the visual line is guided. Particularly, a scenery rapidly shifts (at a high angular speed) outside a curve. Accordingly, the visual line may be guided to an object at a long distance, but should not be guided to an object along a road (at a short distance). Even for a straight road, an object located along the road (at a short distance) shifts at a high speed in the visual field range. Accordingly, the visual line should not be guided to this object.

FIGS. 8 to 12 each depict an example where visual line guidance is performed using the windshield 201 which includes a transmissive region and a non-transmissive region.

Figure 8:
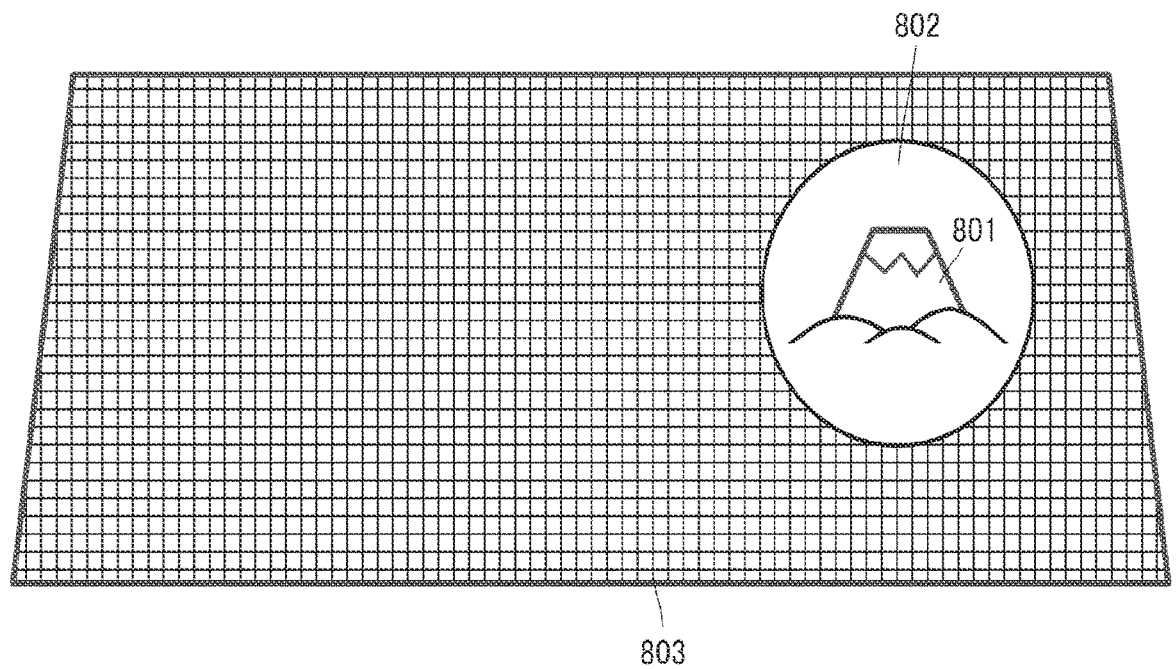
FIG. 8 is a diagram depicting an example of visual line guidance performed by using a windshield.

FIG. 8 depicts a situation where a circular region containing an object 801 corresponding to a scenery point is brought into a transmissive state. In this case, a peripheral remaining region is brought into a non-transmissive state.

A non-transmissive region 803 has no pattern or has a dry and tasteless pattern to make a scenery invisible. The visual field range other than the scenery point is masked by the non-transmissive region 803, and things other than the object 801 are made invisible for the eyes of the person on board. The visual line of the person on board is automatically guided to the visible object 801. In this manner, the person on board is made more interested in the object 801.

When a circular transmissive region 802 is cut out within the non-transmissive region 803 which widely covers the visual field range, a pop-up visual effect of the object 801 is produced within the transmissive region 802 depending on cases. This effect strongly draws attention of the person on board. In addition, it is preferable that the size (diameter) of the circular transmissive region 802 containing the object 801 is set such that an area of a region where the object 801 is visible has a predetermined ratio or smaller. This size is preferable for the following reasons. When the visual field range has a size substantially identical to the size of the object 801, only the object 801 is visible. In this case, the entire image of the object 801 is difficult to recognize. Conversely, when the occupation ratio of the object 801 within the transmissive region 802 is excessively small, the object 801 becomes relatively small in appearance. In this case, visual line guidance is difficult to achieve.

Further, the non-transmissive region 803 is available not only for the purpose of masking things around the object 801, but also for an indication place of guidance information. By displaying guidance information (not depicted in FIG. 8) in the non-transmissive region 803, description of the scenery point can be presented without blocking a superb view.

The guidance information may include description associated with the object 801 (e.g., geographical or topographical characteristics and historical trails), information associated with a driving schedule or a moving route of the vehicle (e.g., destination, arrival scheduled time to the next scenery point or the like, required length of time, and available time of facilities located adjacent to the route), and further information irrelevant to driving of the vehicle. Further, the guidance information may be displayed using characters, drawings, images, or the like.

Figure 9:
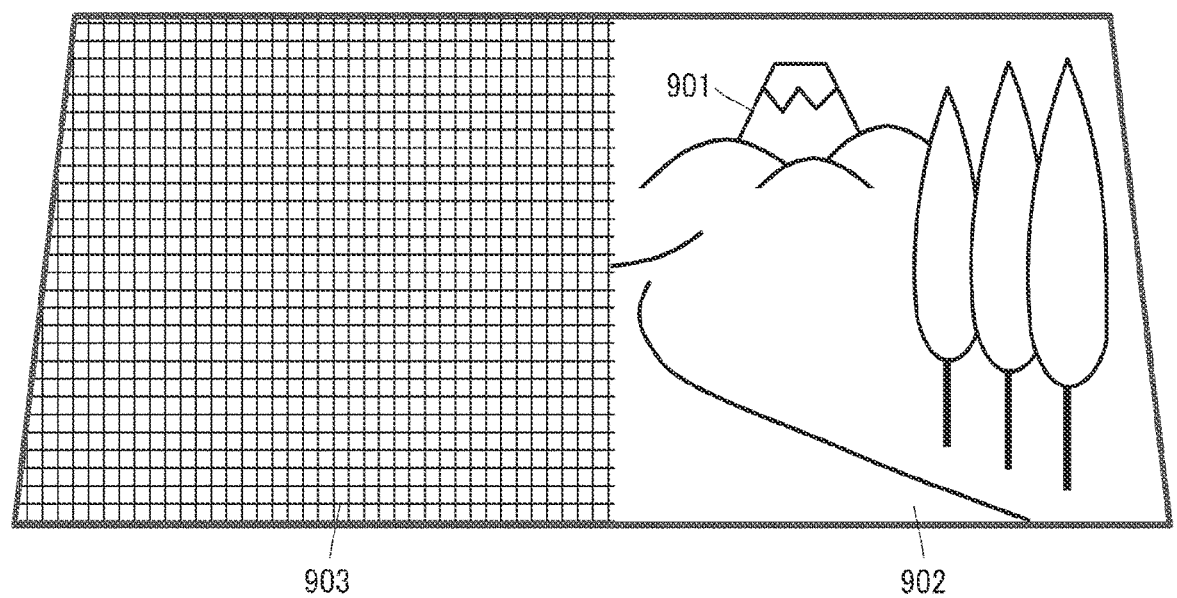
FIG. 9 is another diagram depicting an example of visual line guidance performed by using the windshield.

FIG. 9 depicts a situation of the windshield 201 vertically divided into two parts. A right region containing an object 901 corresponding to a scenery point is brought into a transmissive state, and a left region is brought into a non-transmissive state. According to the example depicted in FIG. 9, the windshield 201 is divided into substantially equal left and right parts.

A non-transmissive region 903 on the left side has no pattern or has a dry and tasteless pattern to make a scenery invisible. The visual field range other than the scenery point is masked by a non-transmissive region 903, and things other than the object 901 are made invisible for the eyes of the person on board. The visual line of the person on board is automatically guided to the object 901 appearing in a transmissive region 902 on the right side. In this manner, the person on board is made more interested in the object 901.

For example, in a case where the visual line is desired to be guided to the object 901 which is long in the vertical direction, such as a high mountain and a high-rise building, a larger portion of the object 901 can be inserted into the visual field range of the person on board by vertically dividing the windshield 201 and forming the transmissive region 902 in the divided part. In addition, it is preferable that a position of vertical division of the windshield 201 is determined such that an area of a region where the object 901 is visible has a predetermined ratio or smaller. This position is preferable for the following reasons. When the transmissive region 902 has a horizontal width substantially equivalent to the length of the object 901, only the object 901 is visible. In this case, the entire image of the object 901 is difficult to recognize. Conversely, when the occupation ratio of the object 901 within the transmissive region 902 is excessively small, the object 901 becomes relatively small in appearance. In this case, visual line guidance is difficult to achieve.

Further, the non-transmissive region 903 is available not only for the purpose of masking things around the object 901, but also for an indication region of guidance information (the same as above). The guidance information may be displayed using characters, drawings, images, or the like.

Figure 10:
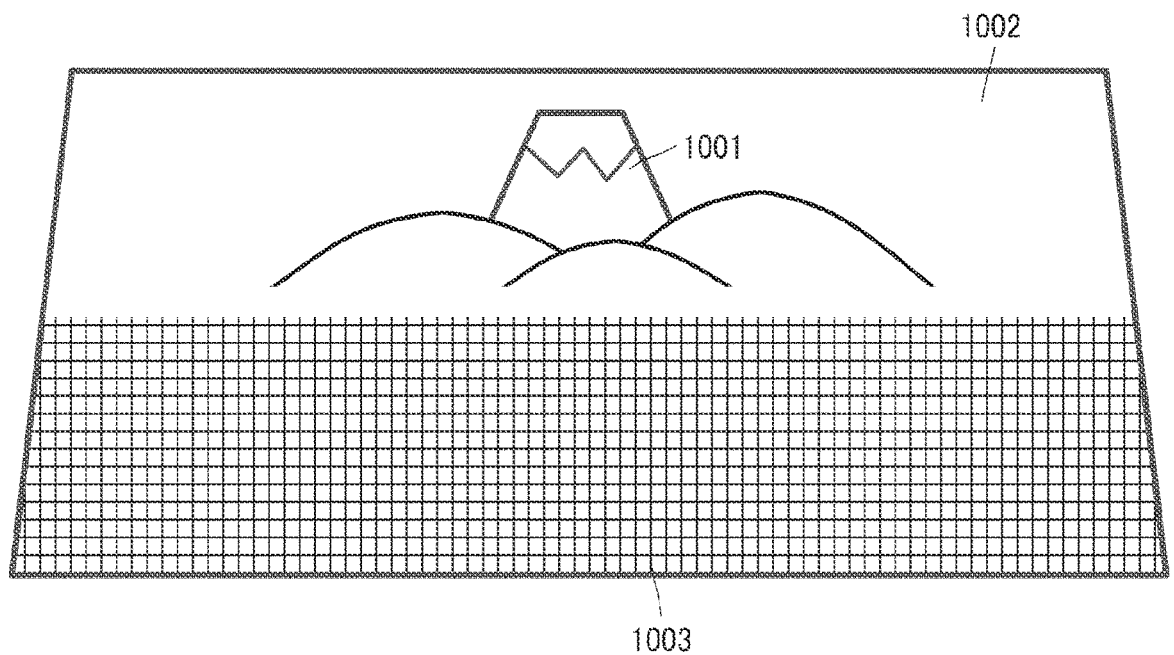
FIG. 10 is still another diagram depicting an example of visual line guidance performed by using the windshield.

FIG. 10 depicts a situation of the windshield 201 horizontally divided into two parts. An upper region containing an object 1001 corresponding to a scenery point is brought into a transmissive state, and a lower region is brought into a non-transmissive state. According to the example depicted in FIG. 10, the windshield 201 is divided into substantially equal upper and lower parts.

A non-transmissive region 1003 on the lower side has no pattern or has a dry and tasteless pattern to make a scenery invisible. The visual field range other than a scenery point is masked by the non-transmissive region 1003, and things other than the object 1001 are made invisible for the eyes of the person on board. The visual line of the person on board is automatically guided to the object 1001 on the upper side. In this manner, the person on board is made more interested in the object 1001.

For example, in a case where the visual line is desired to be guided to the object 1001 which is long in the horizontal direction, such as a chain of mountains (mountain range), a coast, a lake, and a long bridge, a larger portion of the object 1001 can be inserted into the visual field range of the person on board by horizontally dividing the windshield 201 and forming a transmissive region 1002 in the divided part. In addition, it is preferable that a position of horizontal division of the windshield 201 is determined such that an area of a region where the object 1001 is visible has a predetermined ratio or smaller. This position is preferable for the following reasons. When the transmissive region 1002 has a vertical width substantially equivalent to the height of the object 1001, only the object 1001 is visible. In this case, the entire image of the object 1001 is difficult to recognize. Conversely, when the occupation ratio of the object 1001 within the transmissive region 1002 is excessively small, the object 1001 becomes relatively small in appearance. In this case, visual line guidance is difficult to achieve.

Further, the non-transmissive region 1003 is available not only for the purpose of masking things around the object 1001, but also for an indication region of guidance information (the same as above). The guidance information may be displayed using characters, drawings, images, or the like.

Figure 11:
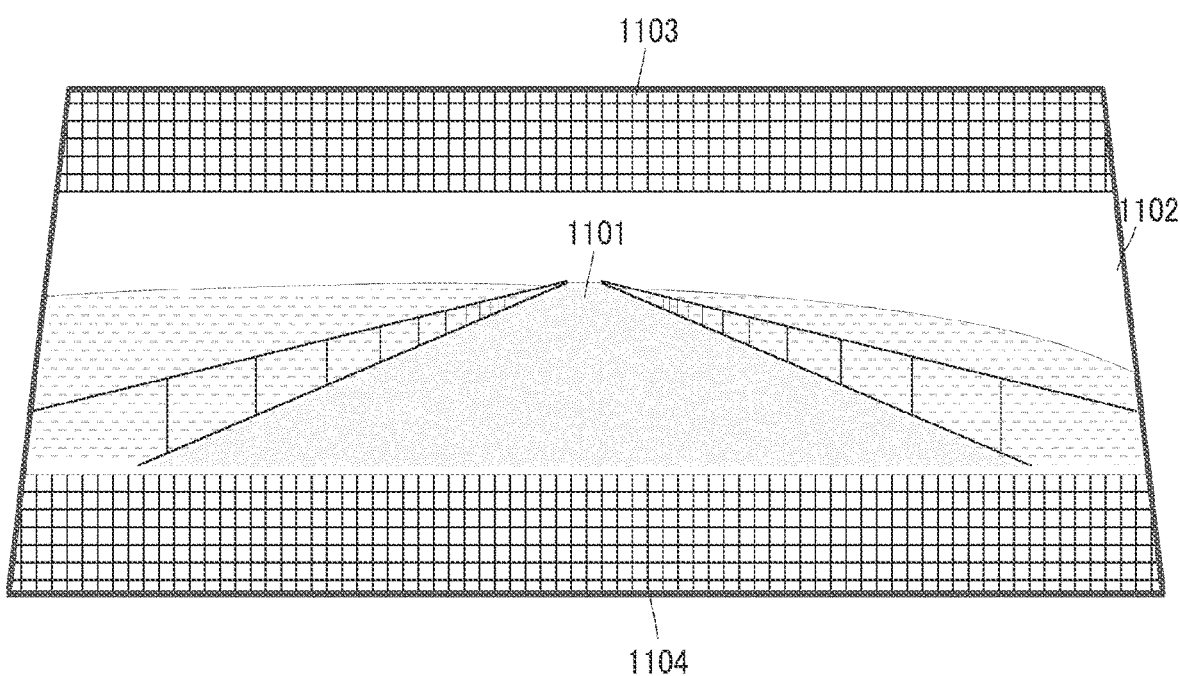
FIG. 11 is yet another diagram depicting an example of visual line guidance performed by using the windshield.

FIG. 11 depicts a situation of the windshield 201 horizontally divided into three parts. A central region containing an object 1101 corresponding to a scenery point is brought into a transmissive state, and each of regions at upper and lower ends is brought into a non-transmissive state.

Each of non-transmissive regions 1103 and 1104 at the upper and lower ends has no pattern or has a dry and tasteless pattern to make a scenery invisible. The visual field range other than the scenery point is masked by the non-transmissive regions 1103 and 1104, and things other than the object 1101 are made invisible for the eyes of the person on board. The visual line of the person on board is automatically guided to the object 1101 near the center. In this manner, the person on board is made more interested in the object 1101.

For example, in a case where the visual line is desired to be guided to the object 1101 which is long in the horizontal direction and visible near the center of the windshield 201, such as a chain of mountains (mountain range), a coast, a lake, and a long bridge, a larger portion of the object 1101 can be inserted into the visual field range of the person on board by horizontally dividing the windshield 201 and forming a transmissive region 1102 at the center. In addition, it is preferable that a position of horizontal division of the windshield 201 is determined such that an area of a region where the object 1101 is visible has a predetermined ratio or smaller. This position is preferable for the following reasons. When the transmissive region 1102 has a vertical width substantially identical to the height of the object 1101, only the object 1101 is visible. In this case, the entire image of the object 1101 is difficult to recognize. Conversely, when the occupation ratio of the object 1101 within the transmissive region 1102 is excessively small, the object 1101 becomes relatively small in appearance. In this case, visual line guidance is difficult to achieve.

Further, each of the non-transmissive regions 1103 and 1104 is available not only for the purpose of masking things around the object 1101, but also for an indication region of guidance information (the same as above). The guidance information may be displayed using characters, drawings, images, or the like.

Figure 12:
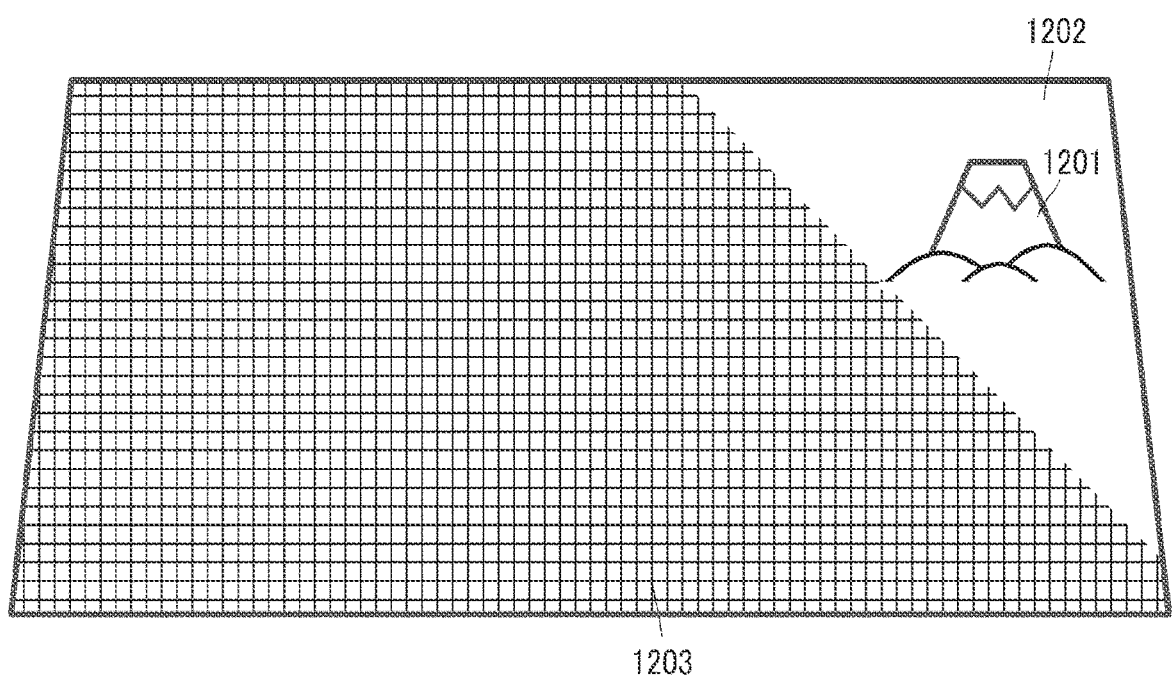
FIG. 12 is a further diagram depicting an example of visual line guidance performed by using the windshield.

FIG. 12 depicts a situation of the windshield 201 which includes a triangular region formed by cutting an upper right corner of the windshield 201 and brought into a transmissive state. A transmissive region 1202 containing an object 1201 of a scenery point is formed in the triangular region, and the remaining region is brought into a non-transmissive state.

A non-transmissive region 1203 in a region other than the upper right portion has no pattern or has a dry and tasteless pattern to make a scenery invisible. The visual field range other than the scenery point is masked by the non-transmissive region 1203, and things other than the object 1201 are made invisible for the eyes of the person on board. The visual line of the person on board is automatically guided to the object 1201 on the right side. In this manner, the person on board is made more interested in the object 1201.

In a case where the object 1201 of the scenery point appears at an offset place such as a location near a peripheral edge of the windshield 201, the object 1201 can be inserted into the visual field range of the person on board by cutting a corner of the windshield 201 and forming the transmissive region 1202 in the cut corner. In addition, it is preferable that a cutting position of the corner and the size of the windshield 201 are determined such that an area of a region where the object 1201 is visible has a predetermined ratio or smaller. These position and size are preferable for the following reasons. When the transmissive region 1202 in the cut corner has an area substantially equivalent to the area of the object 1201, only the object 1201 is visible. In this case, the entire image of the object 1201 is difficult to recognize. Conversely, when the occupation ratio of the object 1201 within the transmissive region 1202 is excessively small, the object 1201 becomes relatively small in appearance. In this case, visual line guidance is difficult to achieve.

Further, the non-transmissive region 903 is available not only for the purpose of masking things around the object 901, but also for an indication region of guidance information (the same as above). The guidance information may be displayed using characters, drawings, images, or the like.

FIGS. 8 to 12 each depict the example where the transmissive region and the non-transmissive region each having any of various shapes and sizes, such as a circular shape, a quadrangular shape, and a triangular shape, are defined in the windshield 201. However, these examples are not required to be adopted. The transmissive region may have an elliptical shape or a polygonal shape having more than four corners, such as a pentagonal shape, a shape cut out along the contour of the object to which the visual line is guided, or a random shape. In what kind of shapes and sizes the transmissive region and the non-transmissive region are allowed to be drawn also depends on resolution or the like of the device used for switching between transmissive and non-transmissive, such as a liquid crystal shutter.

Further, FIGS. 8 to 12 each depict the example where the visual line of the person on board is guided using the windshield 201. However, the visual line of the person on board can similarly be guided using the windows 202 to 206 other than the windshield 201.

Note that the "non-transmissive" of the non-transmissive region is assumed to include not only a case where transmittance of the windows is set to 0%, but also a case where transmittance is reduced to a low value to lower visual recognizability of a scenery. Further, the "transmissive" of the transmissive region is not limited to a case where transmittance of the windows is set to 100%. For example, the transmissive region is assumed to include a transmissive region having transmittance adjusted according to brightness of a visual line point corresponding to a target of visual line guidance, such as direct light, slanting light (side light), and backlight.

C. Visual Line Guidance by Vehicle According to Road Shape

It is extremely rare that a car travels on a flat and straight road. Many roads include left and right curves and slopes. Accordingly, the scenery viewable through the windshield 201 and the other windows 202 to 206 also changes according to the shapes of the roads such as curves and slopes.

Figure 13:
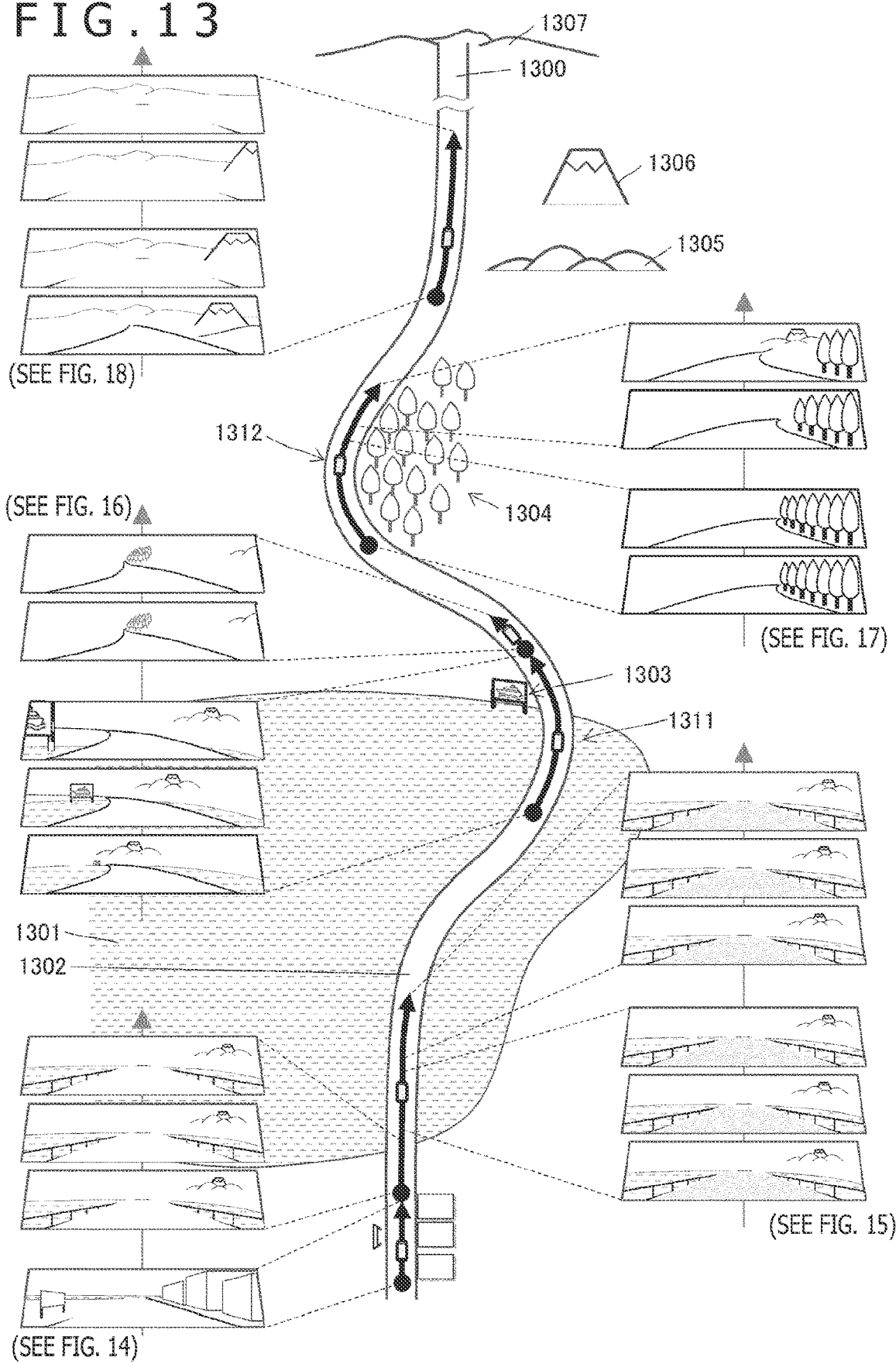
FIG. 13 is a diagram depicting an example of a scenery (no masking) viewed through the windshield of the vehicle traveling on a road.

FIG. 13 illustrates a shape of a road on which a car travels, and a state of a change of a scenery viewable through a windshield of the car for each place on the road in conjunction with the shape of the road.

A road 1300 depicted in the figure passes through a bridge 1302 built over a lake 1301, a sightseeing boat boarding point 1303 on a lakeshore, a sea of trees park 1304, a plateau 1305, and a high mountain 1306 in this order while meandering, and reaches a mountain site 1307. Further, the road 1300 includes a first curve 1311 on the bridge 1302, and a second curve 1312 near the sea of trees park 1304. The first curve 1311 has a right curve and a left curve following the right curve, while the second curve 1312 has a clockwise curve. It is assumed herein that each of the bridge 1302, the sightseeing boat boarding point 1303 on the lakeshore, the sea of trees park 1304, the plateau 1305, the high mountain 1306, and the mountain site 1307 becomes an object at a scenery point. An order of priority is given to each of the plurality of objects on the basis of a score value or the like calculated by a filtering process (described below).

In a case where the vehicle travels on a straight road, a vanishing point of the road viewed through the windshield 201 is located substantially at the center of the windshield 201. On the other hand, in a case where the vehicle travels on a curve, the vanishing point of the road shifts leftward or rightward from the center of the windshield 201. Specifically, the vanishing point shifts leftward in the left curve, and shifts rightward on the right curve. A shift amount is dependent on a curvature of the curve.

While not depicted in the figures, in a case of traveling on a slope such as an upslope and a downslope, the vanishing point of the road shifts upward or downward from the center of the windshield 201 according to an inclination of the slope.

FIGS. 14 to 18 each depict a scenery viewable through the windshield 201 of the car traveling on the road 1300 depicted in FIG. 13. Note that each of FIGS. 14 to 18 depicts a scenery through the windshield 201 in a state where visual line guidance by masking is not applied.

Figure 14:
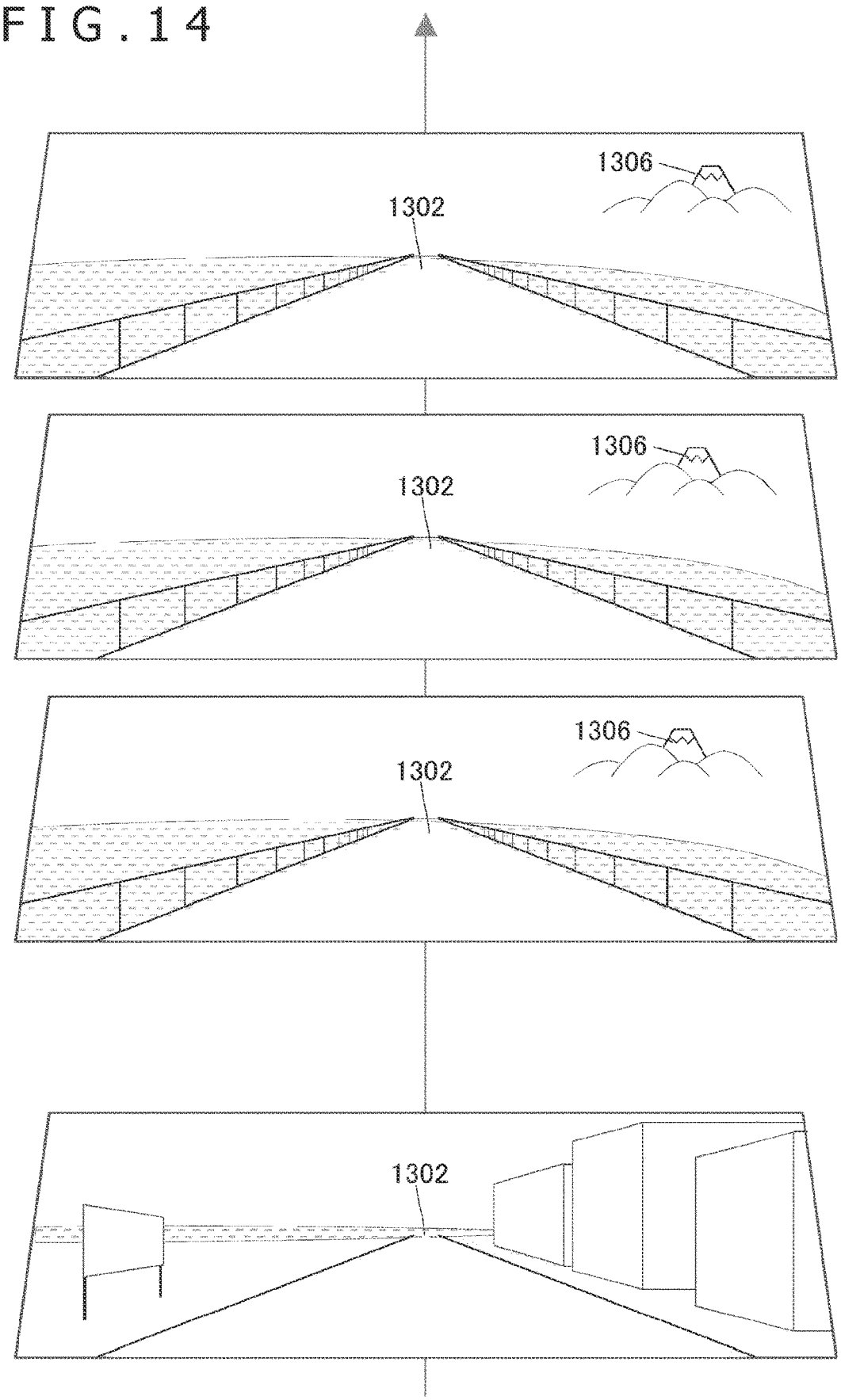
FIG. 14 is another diagram depicting an example of a scenery (no masking) viewed through the windshield of the vehicle traveling on a road.

FIG. 14 depicts a scenery viewable through the windshield 201 of the vehicle traveling on a straight road before the first curve 1311 for each predetermined frame period. The scenery viewed through the windshield 201 during this period includes the bridge 1302 and the high mountain 1306 as objects of scenery points.

Figure 15:
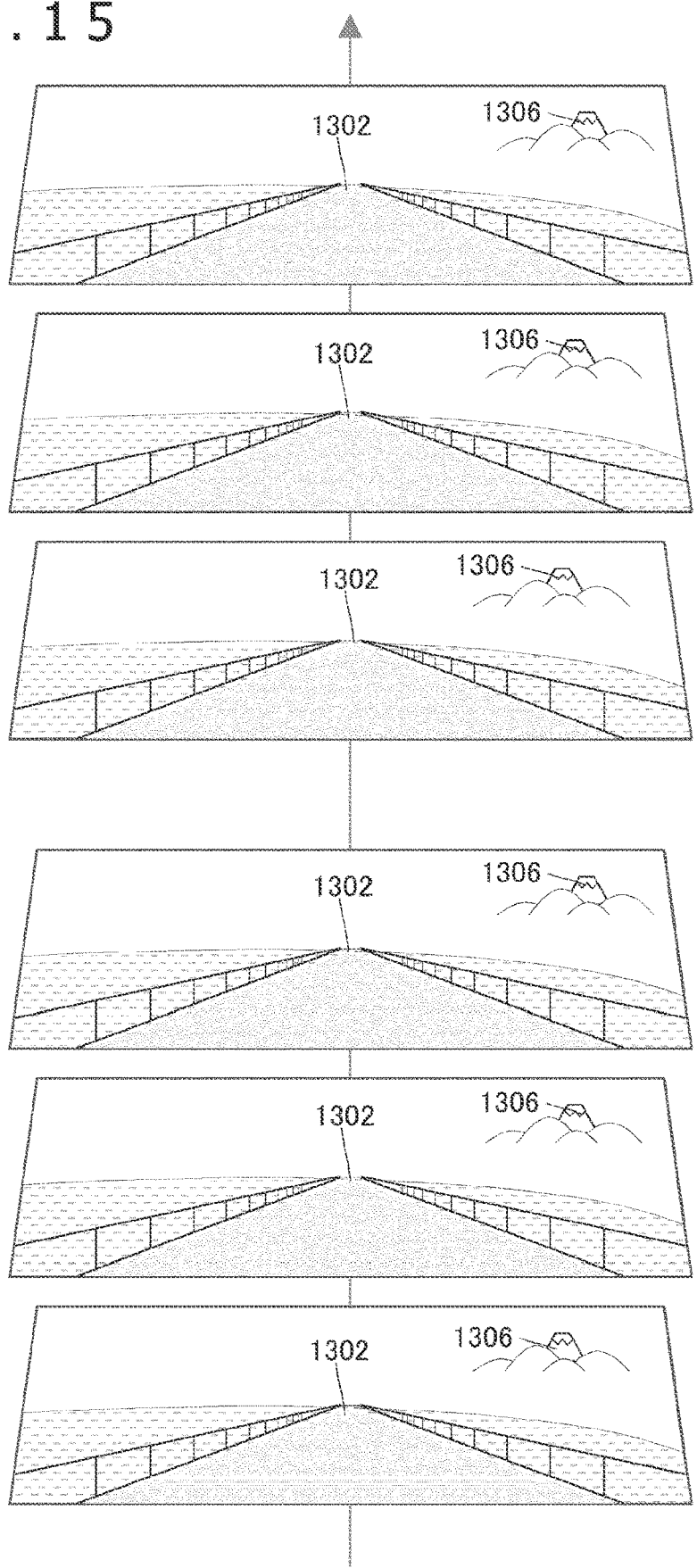
FIG. 15 is still another diagram depicting an example of a scenery (no masking) viewed through the windshield of the vehicle traveling on a road.

Further, FIG. 15 depicts a scenery viewable through the windshield 201 of the vehicle traveling near an entrance of the first curve 1311 for each predetermined frame period. The scenery viewed through the windshield 201 during this period includes the bridge 1302 and the high mountain 1306 as objects of scenery points.

Figure 16:
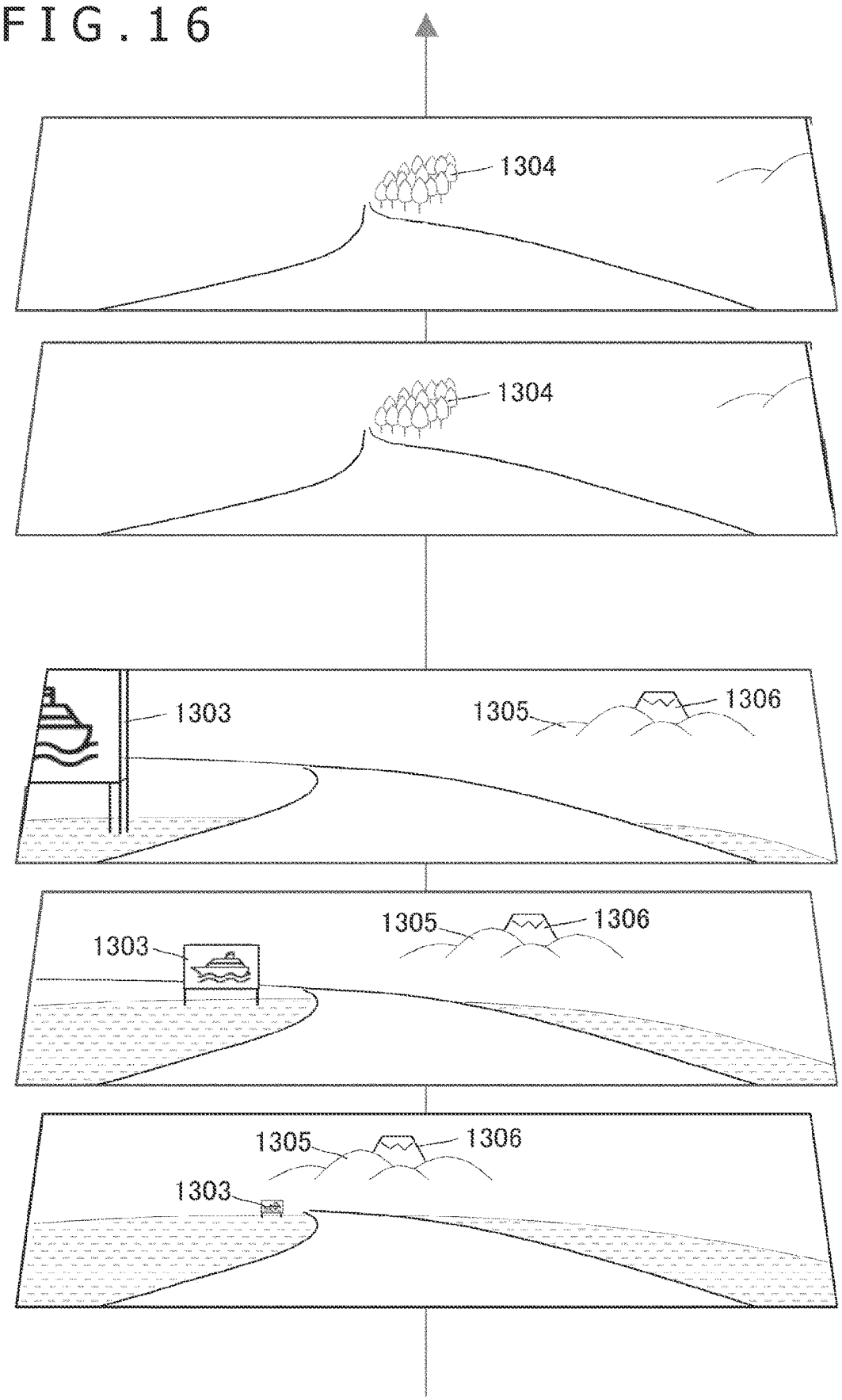
FIG. 16 is yet another diagram depicting an example of a scenery (no masking) viewed through the windshield of the vehicle traveling on a road.

Further, FIG. 16 depicts a scenery viewable through the windshield 201 of the vehicle traveling within the first curve 1311 for each predetermined frame period. The scenery viewed through the windshield 201 during this period includes the sightseeing boat boarding point 1303 on the lakeshore, the plateau 1305, and the high mountain 1306 as objects of scenery points. The sightseeing boat boarding point 1303 disappears from the visual field range in the middle of traveling, and the sea of trees park 1304 appears instead of the sightseeing boat boarding point 1303.

Figure 17:
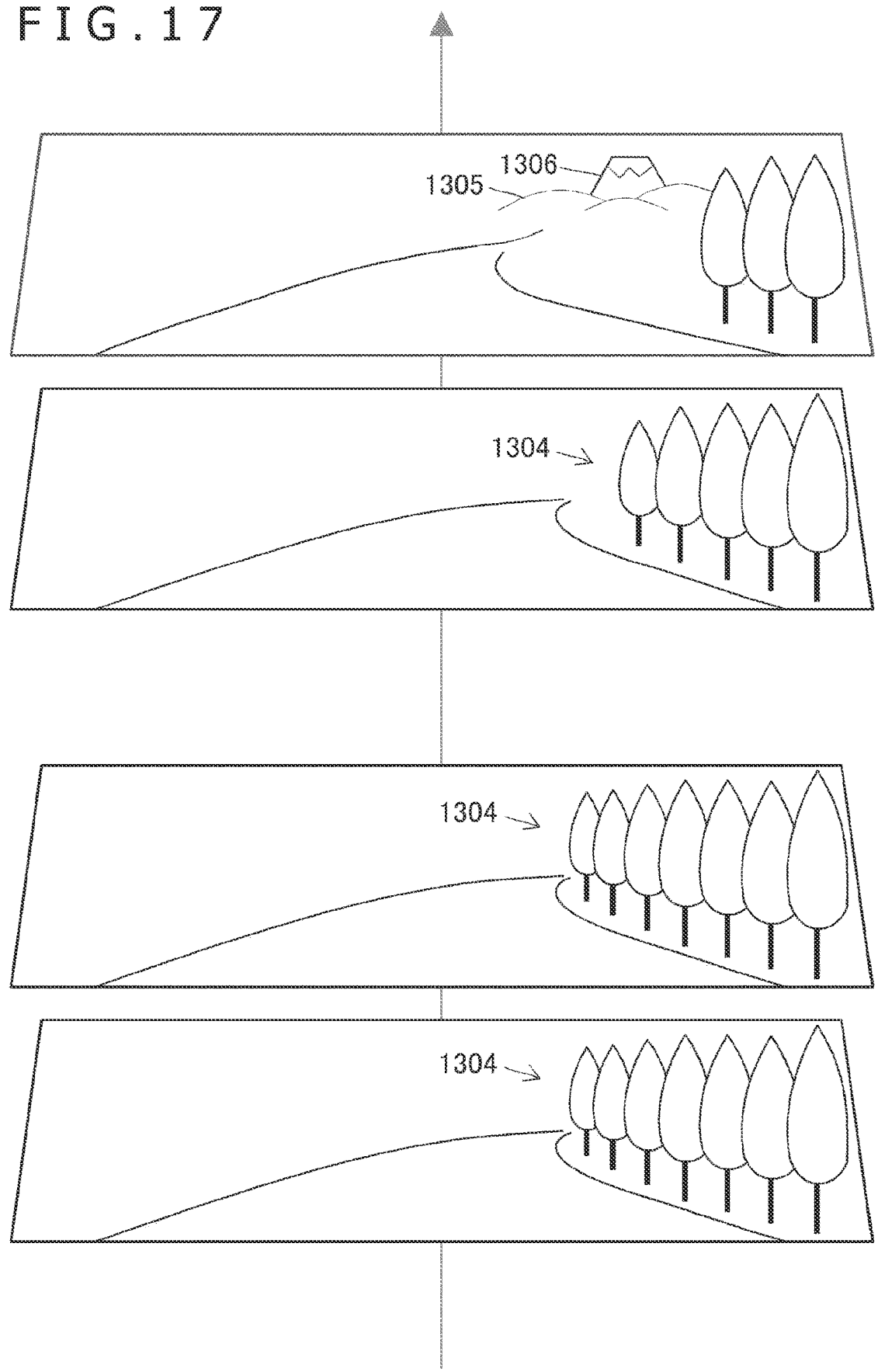
FIG. 17 is a further diagram depicting an example of a scenery (no masking) viewed through the windshield of the vehicle traveling on a road.

Besides, FIG. 17 depicts a scenery viewable through the windshield 201 of the vehicle traveling within the second curve 1312 following the first curve 1311 for each predetermined frame period. The scenery viewed through the windshield 201 during this period includes the sea of trees park 1304 as an object of a scenery point. The plateau 1305 and the high mountain 1306 appear in the middle of traveling.

Figure 18:
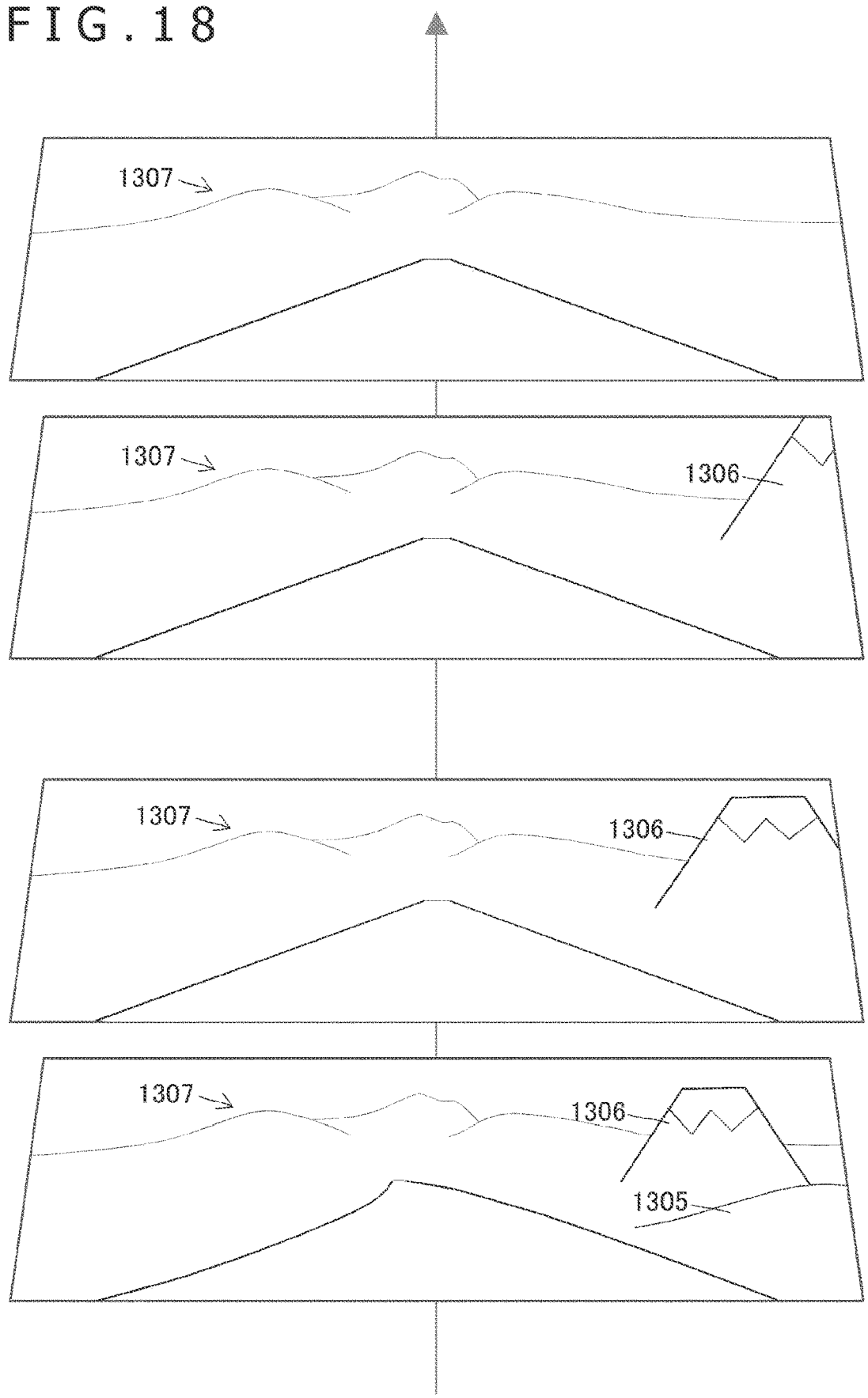
FIG. 18 is a still further diagram depicting an example of a scenery (no masking) viewed through the windshield of the vehicle traveling on a road.

Further, FIG. 18 depicts a scenery viewable through the windshield 201 of the vehicle traveling on a straight road after passing through the second curve 1312 for each predetermined frame period. The scenery viewed through the windshield 201 during this period includes the plateau 1305, the high mountain 1306, and the mountain site 1307 as objects of scenery points.

In short, it is obvious from FIGS. 14 to 18 that the appearance positions where the objects of the respective scenery points appear in the windshield 201 change from moment to moment according to the shape of the road. Needless to say, the size of each of the objects appearing in the windshield 201 also increases or decreases according to the distance from the vehicle to the object of the scenery point. Accordingly, visual line guidance for the person on board is achievable in a suitable manner by dynamically controlling the position, the size, and the shape of the transmissive region for allowing the person on board to view the object, or the position and the size of the non-transmissive region masked to make the region not containing the object invisible for the eyes of the person on board, on the basis of the shape of the road or the distance to the object.

Figure 19:
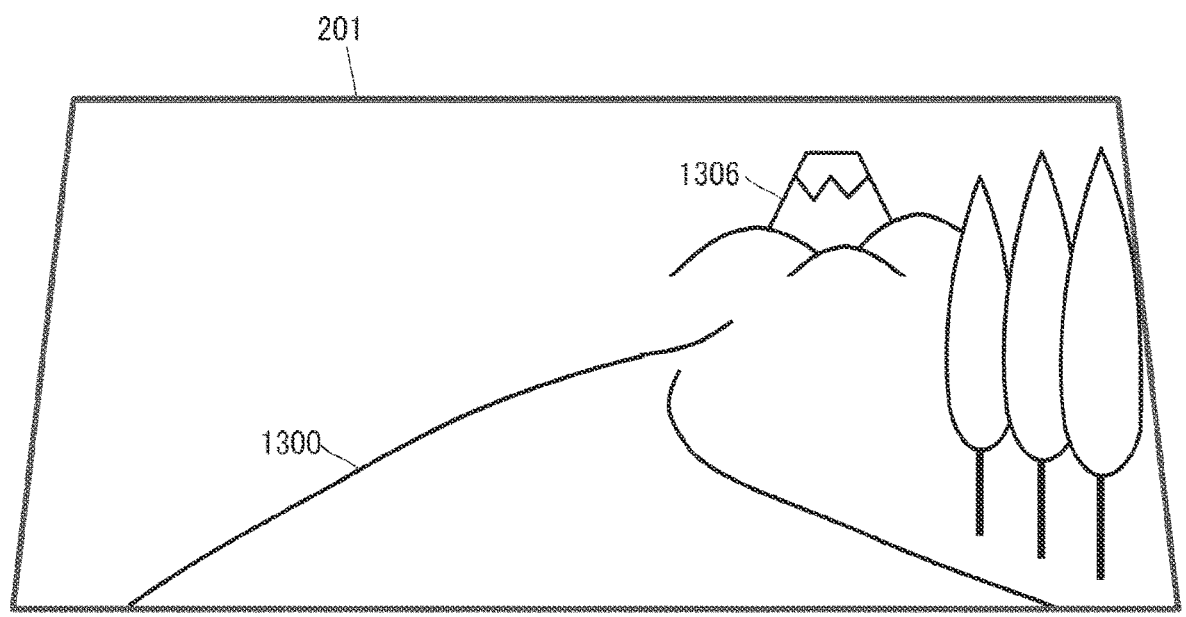
FIG. 19 is a diagram depicting an example of a scenery viewable through the windshield of the traveling vehicle.

FIG. 19 depicts an example of a scenery viewable through the windshield 201 of the vehicle traveling within the second curve 1312 following the first curve 1311. The scenery depicted in FIG. 19 includes the high mountain 1306 as one of scenery points appearing near the upper right of the windshield 201.

Figure 20:
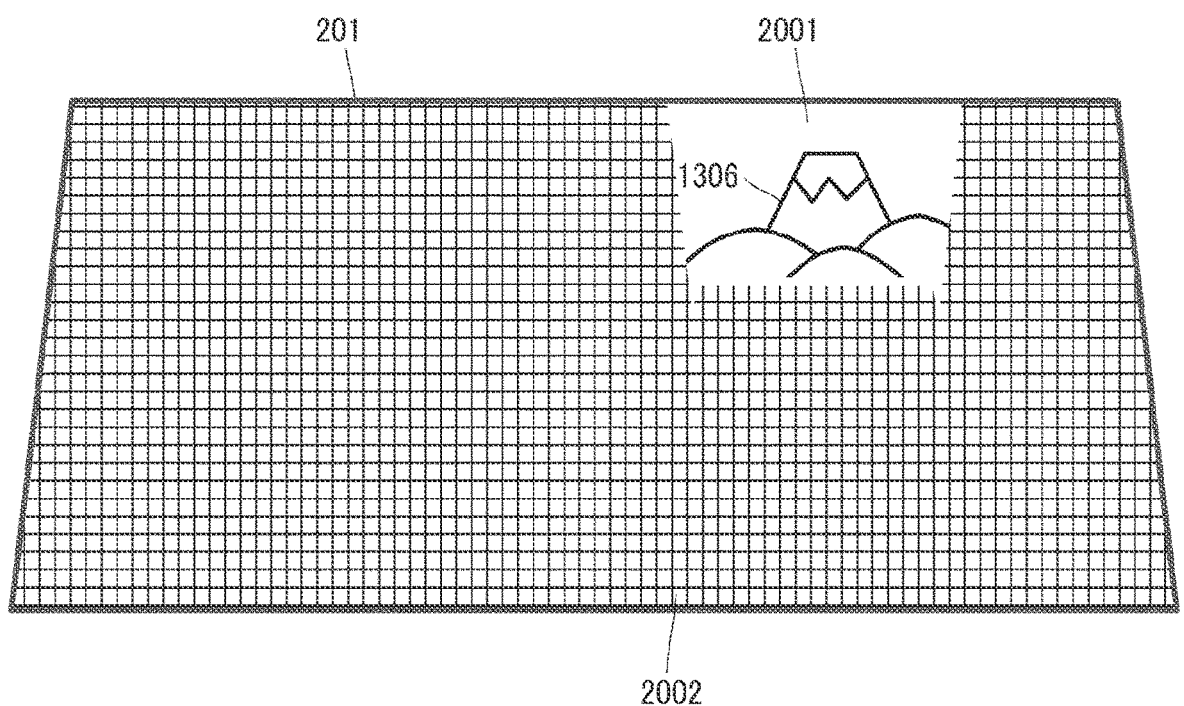
FIG. 20 is a diagram depicting a state where visual line guidance is applied to the windshield of the vehicle at the same traveling position as that of the case of FIG. 19.

Further, FIG. 20 depicts a state where visual line guidance is applied to the windshield 201 of the vehicle at the same traveling position as that of the case of FIG. 19. As depicted in the figure, a transmissive region 2001 includes the high mountain 1306 near the upper right of the windshield 201 as the object of the scenery point such that the area of the portion where the high mountain 1306 in the transmissive region 2001 is viewed has a predetermined ratio or smaller (e.g., approximately 20%). In addition, the remaining region is designated as the non-transmissive region 2002, and things other than the high mountain 1306 are masked to guide the visual line of the person on board toward the high mountain 1306.

When the transmissive region 2001 is cut out within the non-transmissive region 2002 which widely covers the visual field range, a pop-up visual effect of the high mountain 1306 within the transmissive region 2001 is produced depending on cases. This effect strongly draws attention of the person on board. In addition, it is preferable that the size of the transmissive region 2001 containing the high mountain 1306 is set such that an area of a region where the high mountain 1306 is visible has a predetermined ratio or small. This size is preferable for the following reasons. When the visual field range has a size substantially identical to the size of the high mountain 1306, only the high mountain 1306 is visible. In this case, the entire image of the high mountain 1306 is difficult to recognize. Conversely, when the occupation ratio of the high mountain 1306 within the transmissive region 2001 is excessively small, the high mountain 1306 becomes relatively small in appearance. In this case, visual line guidance is difficult to achieve.

According to the vehicle control system 100, appearance timing and an appearance position of an object of each scenery point on the windshield 201 are constantly calculated on the basis of position information associated with the object and obtained from a current position of the vehicle, a vehicle speed and a steering angle of the vehicle, map information, or the like. A liquid crystal shutter disposed on each of the windows 201 to 206 is drive-controlled on the basis of a calculation result, to achieve visual line guidance for the person on board.

Further, because countless scenery points are widely spread on the ground, the vehicle control system 100 filters the scenery points. Initially, the vehicle control system 100 acquires position information associated with the respective scenery points from map information or the like, and extracts, as targets of visual line guidance, things likely to enter the visual field range of the person on board through the windows 201 to 206 such as the windshield 201, on the basis of a result of comparison between a current position and a traveling direction of the vehicle and position information associated with the scenery points.

In a case where a large number of scenery points still remain as candidates only by the comparison with the position information, the vehicle control system 100 performs selection on the basis of information associated with the person on board and a matching process for matching with the respective scenery points. Specifically, the scenery points are selected on the basis of a boarding purpose, schedule information, and background information such as the gender, the age, hobbies, and histories of the person on board. Further, the matching process may calculate a score of each of the scenery points by using a method such as CF (Collaborative Filtering) and CBF (Content Based Filtering), and selects a predetermined number of scenery points having high scores as targets of visual line guidance, or give priority to each scenery point in a descending order of the score. For example, in a case where plural scenery points are simultaneously present in the visual line direction of the person on board of the vehicle, priority may be given to a scenery point located closer, or a scenery point having a higher score may be selected.

Further, the order of priority given to each of the objects of the scenery points is not required to be fixed, and may be changed from moment to moment. For example, the order of priority may be dynamically switched between the objects on the basis of the number of times of visual line guidance performed for the objects in the past, the interval from previous execution of visual line guidance, or the latest state of the person on board (including a physical condition and a temper).

Figure 28:
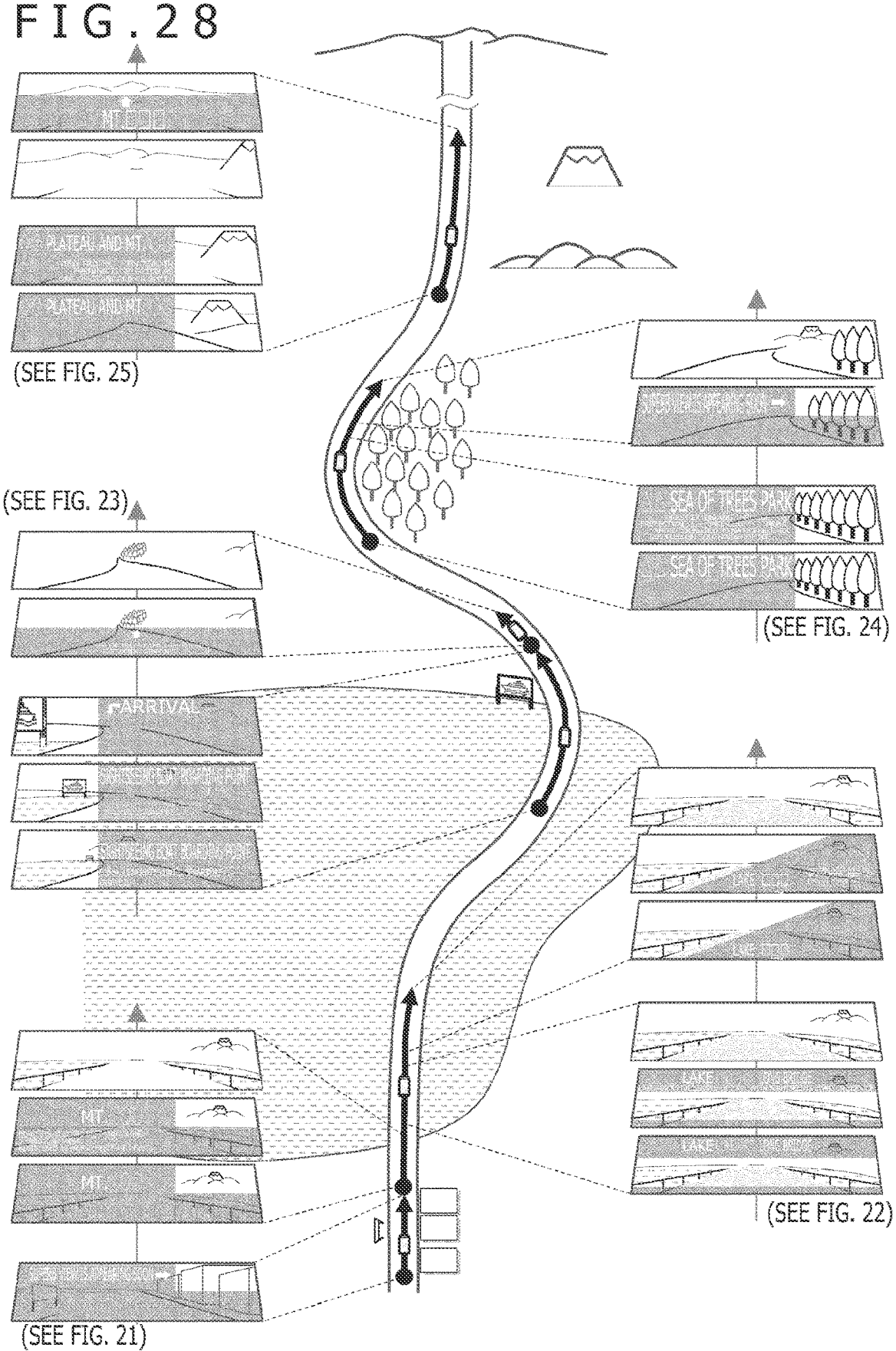
FIG. 28 is a still further diagram depicting a practical example of visual line guidance applied to the windshield of the vehicle.

FIGS. 21 to 25 each depict a state where the visual line guidance is applied to the windshield 201 of the car traveling on the road 1300 depicted in FIG. 13. It is assumed that the vehicle control system 100 constantly calculates appearance timing and an appearance position of an object of each scenery point on the windshield 201 during traveling of the vehicle on the road 1300. Note that traveling sections depicted in FIGS. 21 to 25 correspond to those depicted in FIGS. 14 to 18, respectively. Further, FIG. 28 is a bird's eye view of a state of a shift of visual line guidance during traveling on the road 1300.

Figure 21:
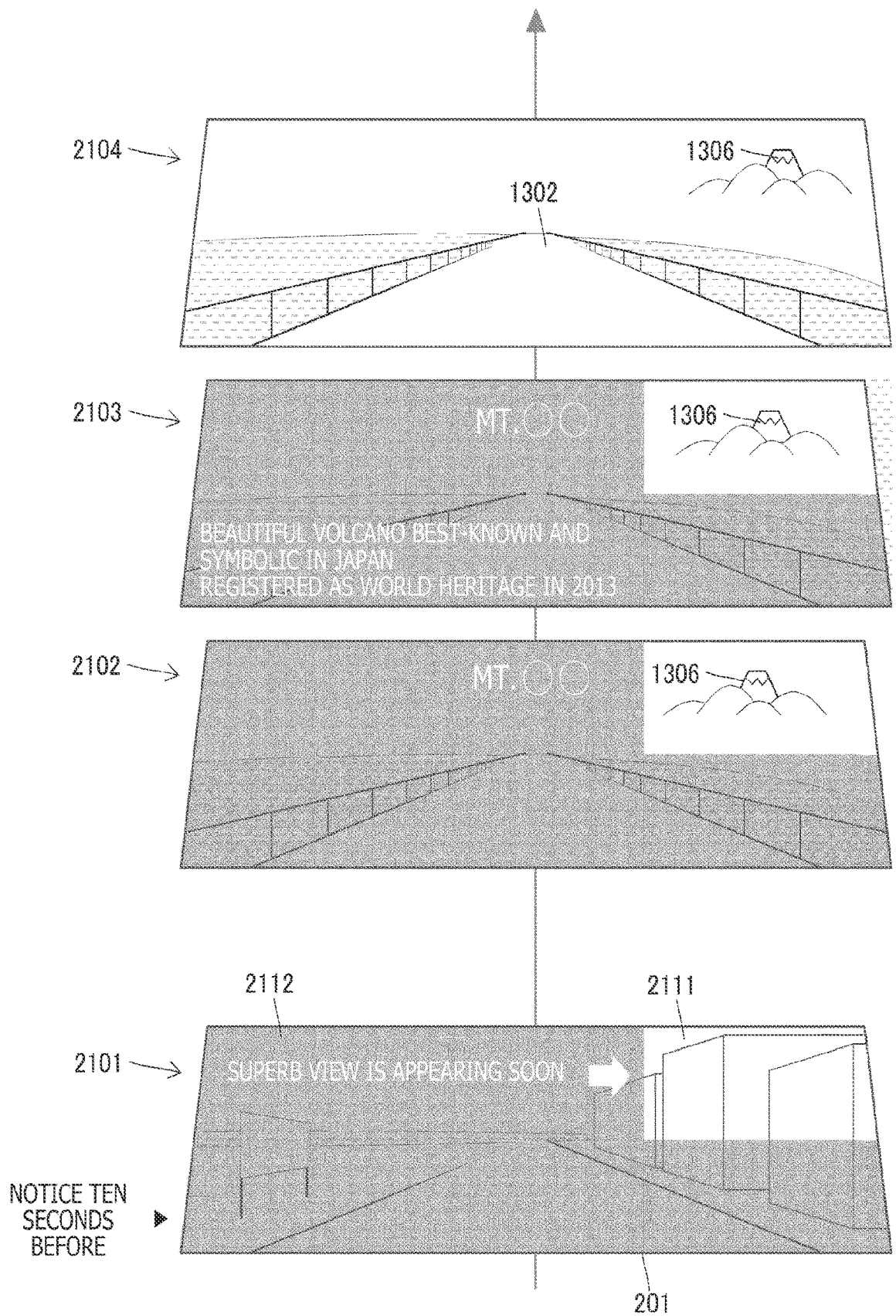
FIG. 21 is a diagram depicting a practical example of visual line guidance applied to the windshield of the vehicle.

FIG. 21 depicts a state where visual line guidance is applied to the windshield 201 of the vehicle traveling on the straight road before the first curve 1311 for each predetermined frame period.

At a traveling position of the vehicle corresponding to a reference number 2101, the high mountain 1306 corresponding to one of the objects of the scenery points is scheduled to appear in a direction near the upper right of the windshield 201. In this case, the high mountain 1306 is invisible behind a building adjacent to the right side of the road, and is scheduled to appear after ten seconds. Accordingly, the windshield 201 is temporarily brought into a non-transmissive state, and a transmissive region 2111 is prepared near the upper right beforehand. Further, looking ahead the appearance position of the high mountain 1306, guidance information "superb view is appearing soon" is generated to give advance notice that the high mountain 1306 will appear in ten seconds. This notice information is displayed on a non-transmissive region 2112 of the windshield 201.

Subsequently, as indicated by a reference number 2102, the high mountain 1306 corresponding to the object of the scenery point appears in the transmissive region 2111 of the windshield 201 as announced. Then, guidance information "Mt. - - -" indicating the name of the high mountain 1306 is generated. This guidance information is displayed on the non-transmissive region 2112 of the windshield 201.

Note that the bridge 1302 corresponding to an object of another scenery point also appears in the visual field range of the windshield 201 at this point of time. However, visual line guidance to the bridge 1302 is not started for reasons such as difficulty in simultaneous execution of visual line guidance together with visual line guidance already started toward the high mountain 1306 and higher priority given to the high mountain 1306 than the end 1302.

Further, as indicated by a reference number 2103, guidance information describing details of the high mountain 1306, i.e., "beautiful volcano best-known and symbolic in Japan, registered as world heritage in 2013- - - ," is generated and displayed while being overlapped on the non-transmissive region 2112 of the windshield 201.

After the visual line of the person on board is guided to the high mountain 1306 in such a manner, the entire window of the windshield 201 is brought into a transmissive state by cancelling the non-transmissive state of the non-transmissive region 2112 as indicated by a reference number 2104. As a result, the person on board is allowed to enjoy the scenery throughout a wide visual field range with awareness of the high mountain 1306.

Figure 22:
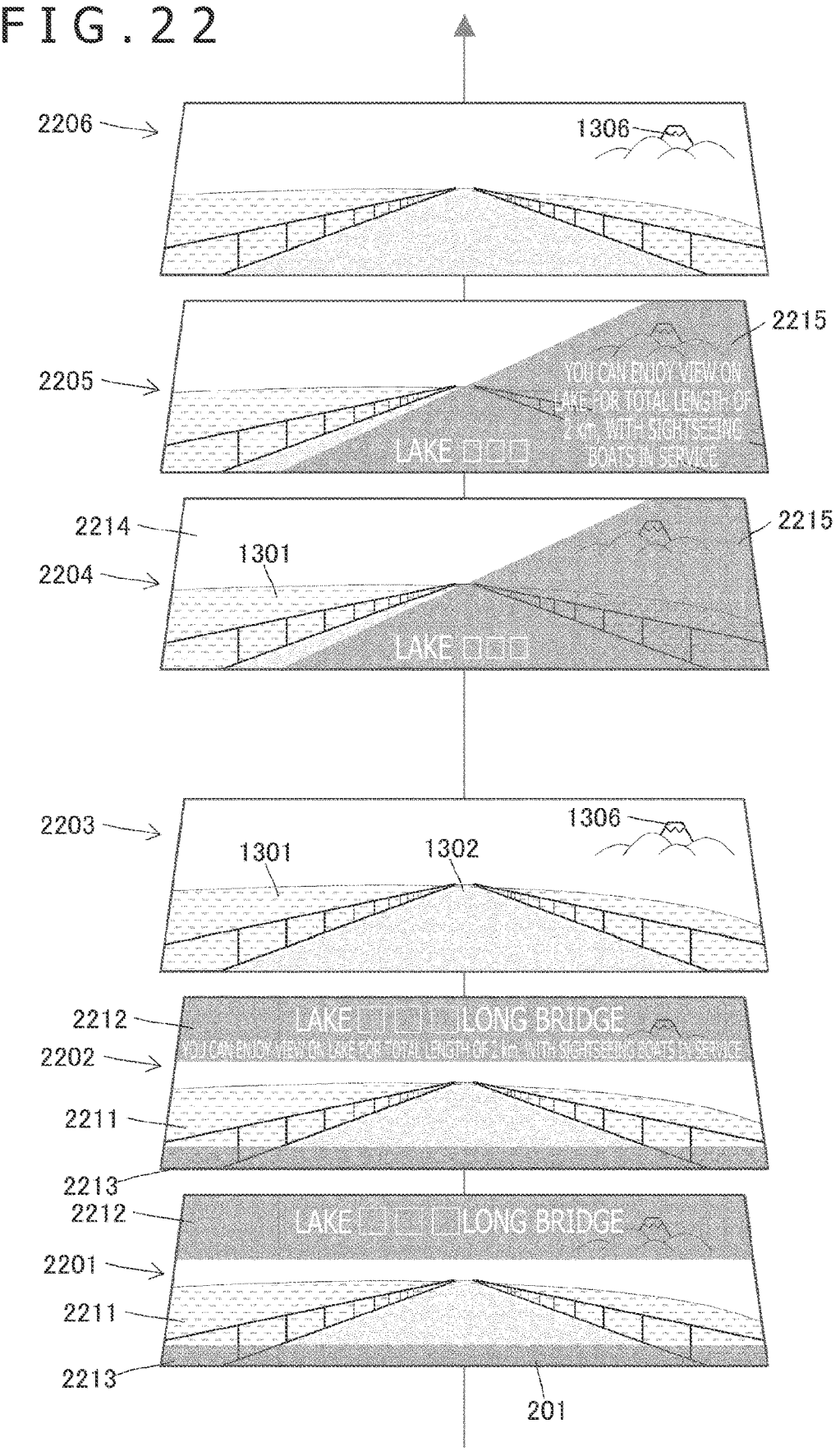
FIG. 22 is another diagram depicting a practical example of visual line guidance applied to the windshield of the vehicle.

Further, FIG. 22 depicts a state where visual line guidance is applied to the windshield 201 of the vehicle traveling near the entrance of the first curve 1311 for each predetermined frame period.

At a traveling position of the vehicle corresponding to a reference number 2201, the bridge 1302 and the high mountain 1306 simultaneously exist as objects of scenery points within the visual field of the windshield 201. At this time, visual line guidance to the high mountain 1306 has already been completed. Accordingly, visual line guidance to the bridge 1302 as guidance not started before (described above) is started. Specifically, the windshield 201 is horizontally divided into three parts. A central region 2211 containing the object 1101 corresponding to a scenery point is brought into a transmissive state, and each of regions 2212 and 2213 at upper and lower ends is brought into a non-transmissive state. In this manner, the visual line of the person on board is guided to the bridge 1302 within the transmissive region 2211. Further, guidance information "Lake - - - Long Bridge" indicating the name of the bridge 1302 is generated. This guidance information is displayed on the non-transmissive region 2212 in an upper part of the windshield 201.

The vehicle traveling on the road 1300 in this manner approaches the lakeshore, and reaches the sightseeing boat boarding point 1303 corresponding to the object of the next scenery point. Then, an appearance position of the sightseeing boat boarding point 1303 is looked ahead, and guidance information associated with the bridge 1302 and including notice information associated with the sightseeing boat boarding point 1303, i.e., "you can enjoy view on lake for total length of 2 km, with sightseeing boats in service" is generated. This guidance information is displayed on the non-transmissive region 2212 in the upper part of the windshield 201 as indicated by a reference number 2202.

After the visual line of the person on board is guided to the bridge 1302, the entire window is brought into a transmissive state by cancelling the non-transmissive state of the regions 2212 and 2213 of the windshield 201 as indicated by a reference number 2203. In this manner, the person on board is allowed to enjoy a view of the lake 1301 during traveling on the bridge 1302.

After visual line guidance to the bridge 1302 is completed as described above, visual line guidance to the lake 1301 is subsequently started. The sightseeing boat boarding point 1303 is scheduled to appear in a left part of the windshield 201. Accordingly, as indicated by a reference number 2214, a view of the lake 1301 on the left side of the bridge 1302 is provided by bringing a triangular region cut at an upper left corner of the windshield 201 into a transmissive state. Further, guidance information "Lake - - -" indicating the name of the lake 1301 is displayed using a non-transmissive region 2215.

Further, with approach of the sightseeing boat boarding point 1303, an appearance position of the sightseeing boat boarding point 1303 is looked ahead. Thereafter, as indicated by a reference number 2205, detailed guidance information including notice information associated with the sightseeing boat boarding point 1303, i.e., "you can enjoy view on lake for total length of 2 km, with sightseeing boats in service" is displayed using a non-transmissive region 2215.

After visual line guidance of the person on board and display of the notice information associated with the sightseeing boat boarding point 1303 are completed in such a manner, the entire window is brought into a transmissive state to provide a view of the lake 1301 by cancelling the non-transmissive state of the non-transmissive region 2215 of the windshield 201 as indicated by a reference number 2206.

Figure 23:
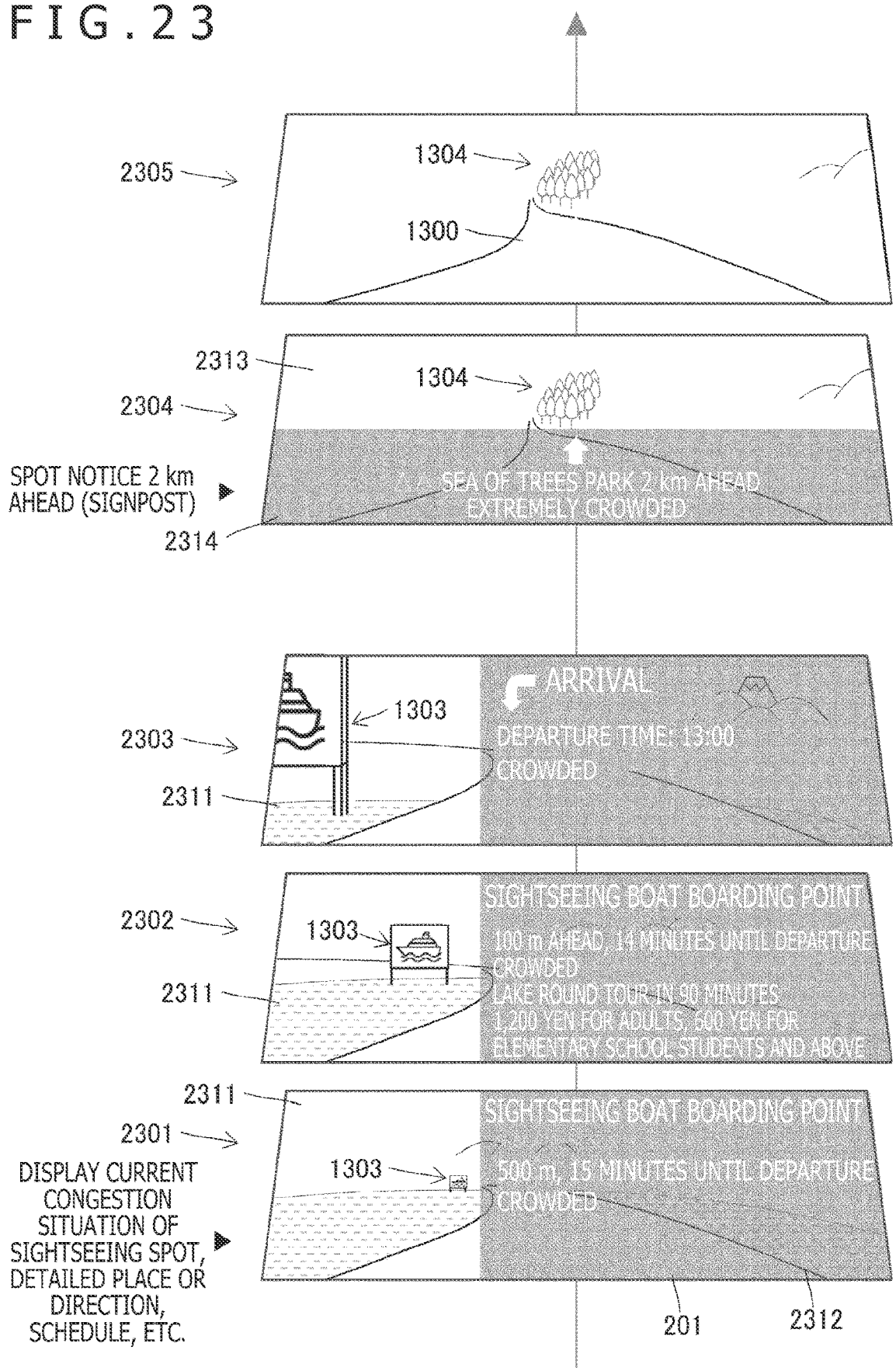
FIG. 23 is still another diagram depicting a practical example of visual line guidance applied to the windshield of the vehicle.

Further, FIG. 23 depicts a state where visual line guidance is applied to the windshield 201 of the vehicle traveling within the first curve 1311 for each predetermined frame period.

At a traveling position of the vehicle corresponding to a reference number 2301, the sightseeing boat boarding point 1303 as the object of the next scenery point appears in a small size in a left part of the windshield 201. Accordingly, visual line guidance to the sightseeing boat boarding point 1303 is started. Specifically, the windshield 201 is vertically divided into two parts. A left region 2311 containing the sightseeing boat boarding point 1303 is brought into a transmissive state, and a right region 2312 is brought into a non-transmissive state. In this manner, the visual line of the person on board is guided to the sightseeing boat boarding point 1303 within the transmissive region 2311. Further, guidance information indicating a remaining distance to the sightseeing boat boarding point 1303, a service schedule and a use situation of sightseeing boats, i.e., "sightseeing boat boarding point, 500 m, 15 minutes until departure, crowded" is generated. This guidance information is displayed on the non-transmissive region 2312 of the windshield 201.

When the vehicle travels on the road 1300 in this condition and further approaches the sightseeing boat boarding point 1303, information such as numerical values is updated. In addition, detailed guidance information associated with use of sightseeing boats such as fares, a congestion situation, and a required length of time of the sightseeing boats, i.e., "sightseeing boat boarding point, 100 m, 14 minutes until departure, crowded, lake round tour in 90 minutes, 1,200 yen for adults and 600 yen for elementary school students and above" is generated. Display of the guidance information on the non-transmissive region 2312 in the right half part of the windshield 201 is switched to this guidance information as indicated by a reference number 2302. The person on board is allowed to determine whether to use the sightseeing boat by checking the fares and the required length of time before arrival at the sightseeing boat boarding point 1303. It is assumed herein that the person on board has decided to board the sightseeing boat.

When the vehicle subsequently arrives at the sightseeing boat boarding point 1303, guidance information including information such as the arrival, the congestion situation of the sightseeing boats, and the schedule, i.e., "arrival, departure time: 13:00, crowded" is generated as indicated by a reference number 2303. This guidance information is displayed on a non-transmissive region 2312 in the right half of the windshield 201.

After completion of a cruise on the lake 1301 by using the sightseeing boat, the person on board rides into the vehicle. The vehicle restarts traveling on the road 1300.

A traveling position of the vehicle corresponding to a reference number 2304 comes out of the lake 1301 at a position near an end edge of the first curve 1311. At this position, the sea of trees park 1304 corresponding to the object of the next scenery point appears in a small size at a far distance within the visual field range of the windshield 201. Accordingly, the windshield 201 is horizontally divided into two parts. An upper region 2313 containing the sea of trees park 1304 is brought into a transmissive state, and a lower region 2314 is brought into a non-transmissive state. Further, guidance information indicating the name of the sea of trees park 1304, the remaining distance, and the congestion situation, i.e., "- - - Sea of trees park 2 km ahead, extremely crowded" is generated. This guidance information is displayed on the non-transmissive region 2314 in a lower part of the windshield 201.

After the visual line guidance of the person on board and display of the guidance information announcing the arrival at the sea of trees park 1304 are completed in such a manner, the entire window is brought into a transmissive state to provide a view of the sea of trees park 1304 by cancelling the non-transmissive state of the non-transmissive region 2214 of the windshield 201 as indicated by a reference number 2305.

Figure 24:
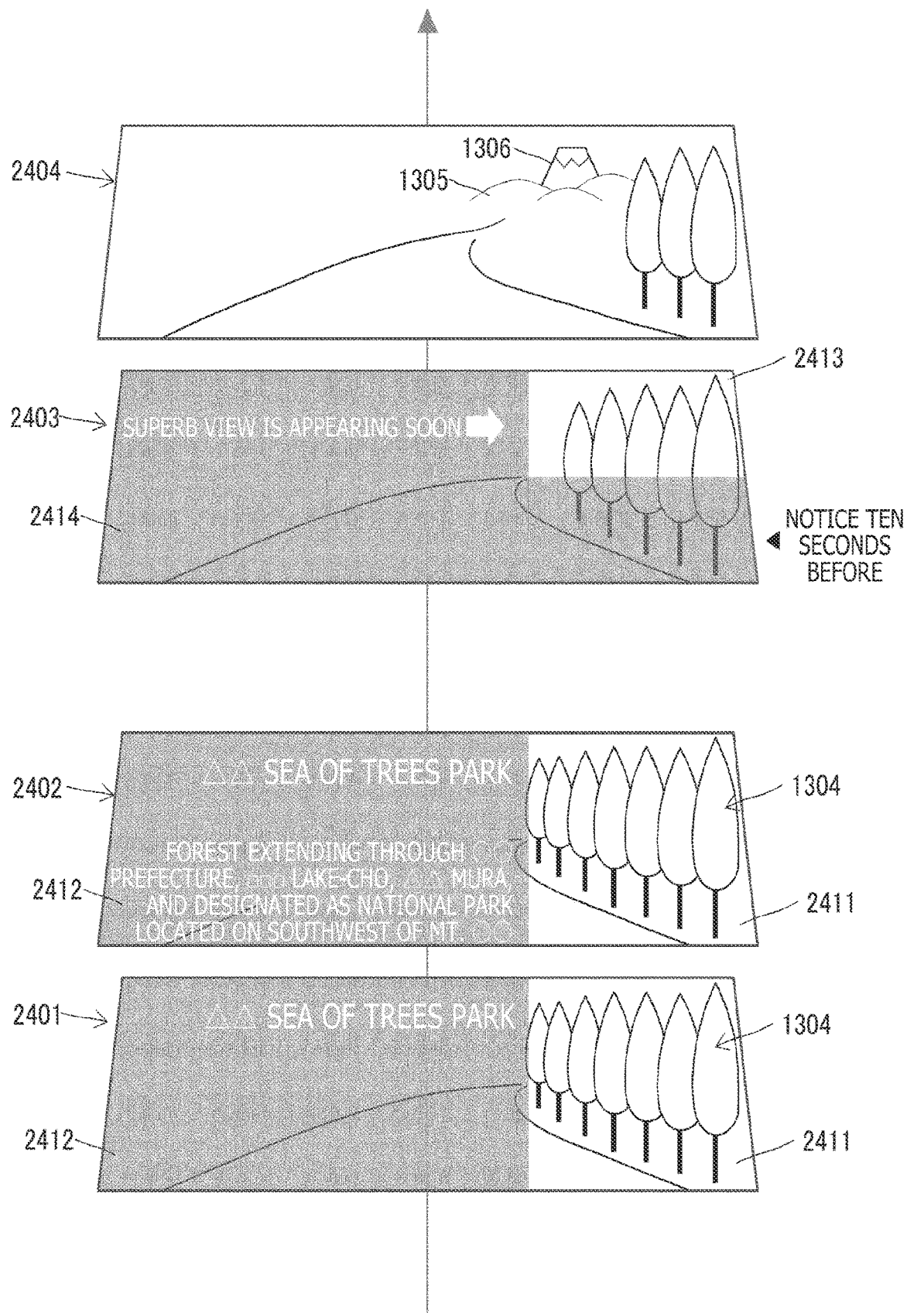
FIG. 24 is yet another diagram depicting a practical example of visual line guidance applied to the windshield of the vehicle.

Further, FIG. 24 depicts a state where visual line guidance is applied to the windshield 201 of the vehicle traveling within the second curve 1312 following the first curve 1311 for each predetermined frame period.

At the traveling position of the vehicle corresponding to a reference number 2401, the vehicle has already arrived at the sea of trees park 1304, and the sea of trees park 1304 appears in a large size in a right part of the windshield 201. Accordingly, the windshield 201 is vertically divided into two parts. A right region 2411 containing the sea of trees park 1304 is brought into a transmissive state, and a left region 2412 is brought into a non-transmissive state. In this manner, the visual line of the person on board is guided to the sea of trees park 1304 within the transmissive region 2411. Further, guidance information "- - - sea of trees park" indicating the name of the sea of trees park 1304 is generated, and is displayed on the non-transmissive region 2412 in the left part of the windshield 201.

A similar scenery continues for a while in the windshield 201 during traveling within the second curve 1312. Detailed guidance information associated with the sea of trees park 1304, i.e., "- - - Sea of trees park, forest extending through - - - Prefecture - - - lake-cho, - - - mura, and designated as national park located on southwest of Mt. - - - ," is newly generated. Thereafter, as indicated by a reference number 2402, this guidance information is displayed on the non-transmissive region 2412 in the left part of the windshield 201. At this time, the visual line guidance to the sea of trees park 1304 is assumed to have been completed.

At a subsequent traveling position of the vehicle corresponding to a reference number 2403, there exists a superb view which contains the plateau 1305 corresponding to an object of a scenery point and appearing in a direction near the upper right of the windshield 201 and the high mountain 1306 appearing at the back of the plateau 1305. However, this superb view is invisible behind trees of the sea of trees park 1304, and is scheduled to appear in ten seconds. Accordingly, appearance positions of the plateau 1305 and the high mountain 1306 are looked ahead, and a transmissive region 2413 is prepared near the upper right of the windshield 201 beforehand. Further, guidance information announcing appearance of a spot of a superb view to the person on board, i.e., "superb view is appearing soon" is generated. This guidance information is displayed on a non-permissive region 2414 of the windshield 201.

After the visual line of the person on board is guided in the direction where the superb view appears in such a manner, the entire window is brought into a transmissive state by cancelling the non-transmissive state of the non-transmissive region 2112 of the windshield 201 as indicated by a reference number 2404. As a result, the person on board is allowed to enjoy the superb view produced by the plateau 1305 and the high mountain 1306 in a wide visual field range without missing the view.

Figure 25:
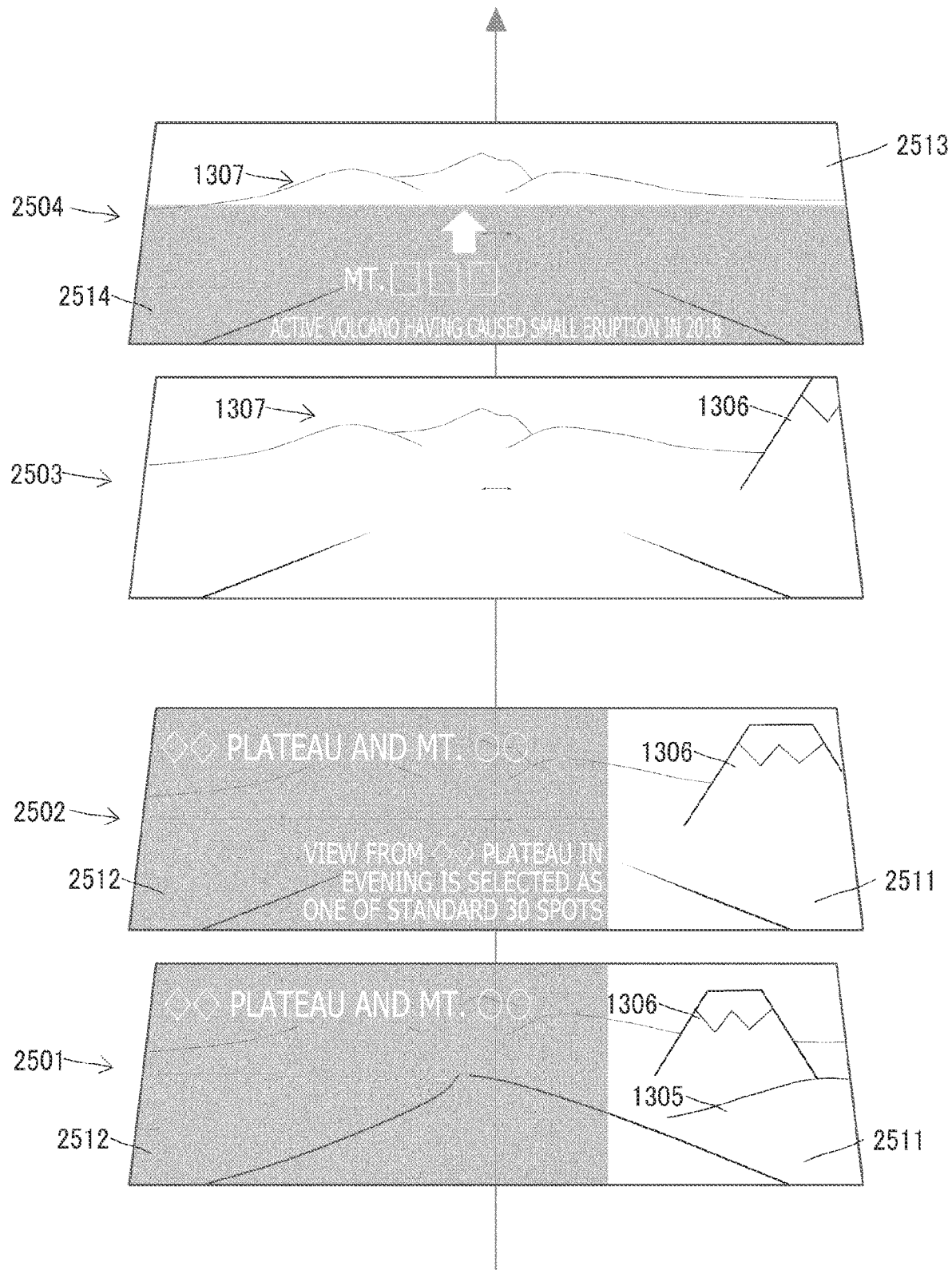
FIG. 25 is a further diagram depicting a practical example of visual line guidance applied to the windshield of the vehicle.

Further, FIG. 25 depicts a state where visual line guidance is applied to the windshield 201 of the vehicle traveling on a straight road after passing through the second curve 1312 for each predetermined frame period.

At a traveling position of the vehicle corresponding to a reference number 2501, the superb view where both the plateau 1305 and the high mountain 1306 at the back are simultaneously visible appears in the right half of the windshield 201. Accordingly, the windshield 201 is vertically divided into two parts. A right region 2511 containing the superb view constituted by the plateau 1305 and the high mountain 1306 is brought into a transmissive state, and a left region 2512 is brought into a non-transmissive state. In this manner, the visual line of the person on board is guided to the superb view within the transmissive region 2511. In addition, guidance information "- - - Plateau and Mt. - - -" indicating the respective names of the plateau 1305 and the high mountain 1306 constituting the superb view is generated. This guidance information is displayed on the non-transmissive region 2512 of the windshield 201.

Note that the plateau 1305 is a scenery point appearing for the first time, and is determined as a target of visual line guidance. Further, the high mountain 1306 is an object for which visual line guidance has already been performed (during traveling of the vehicle in the vicinity before the first curve 1311). However, a combination of the plateau 1305 and the high mountain 1306 are designated as a target of visual line guidance on the basis of the fact that a period of time has elapsed from the previous visual line guidance to the high mountain 1306 and the fact that the composition where the high mountain 1306 is visible at the back of the plateau 1305 is a superb view.

Thereafter, guidance information "- - - Plateau and Mt. - - - , view from - - - Plateau in evening is selected as one of standard 30 spots" indicating details of the plateau 1305 and the high mountain 1306 is generated. This guidance information is displayed on the non-transmissive region 2512 as indicated by a reference number 2502.

After the visual line of the person on board is guided in the direction where the superb view appears in such a manner, the entire window is brought into a transmissive state by cancelling the non-transmissive state of the non-transmissive region 2512 of the windshield 201 as indicated by a reference number 2503. As a result, the person on board is allowed to enjoy the superb view produced by the plateau 1305 and the high mountain 1306 in a wide visual field range without missing the view.

Thereafter, at a traveling position of the vehicle corresponding to a reference number 2504, the mountain site 1307 corresponding to one of the objects of the scenery points appears in a small size at a far distance within the visual field range of the windshield 201. Accordingly, the windshield 201 is horizontally divided into two parts. An upper region 2513 containing the mountain site 1307 is brought into a transmissive state, and a lower region 2514 is brought into a non-transmissive state. Further, guidance information describing the name of the mountain site 1307 and details of the mountain site 1307, i.e., "Mt. - - - , active volcano having caused small eruption in 2018" is generated. This guidance information is displayed on the non-transmissive region 2514 in the lower part of the windshield 201.

D. Configuration of Visual Line Guidance System

Figure 26:
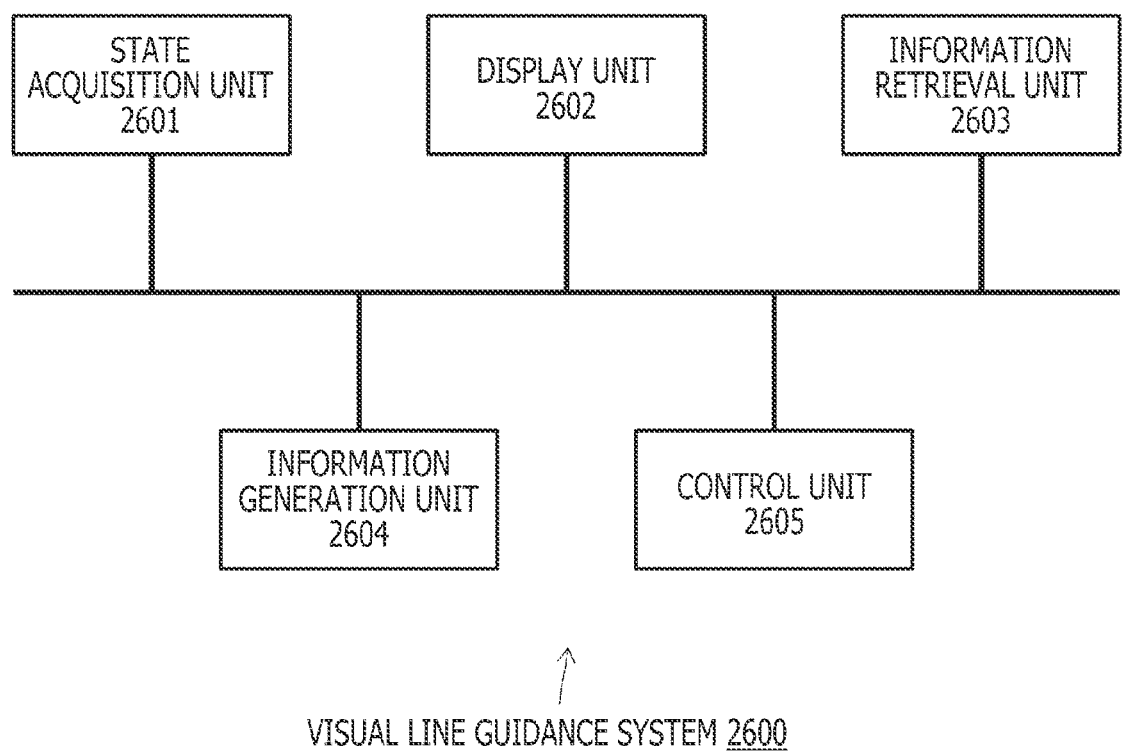
FIG. 26 is a diagram depicting a functional configuration example of a visual line guidance system 2600.

FIG. 26 depicts a functional configuration example of a visual line guidance system 2600. The visual line guidance system 2600 is configured to execute visual line guidance using the windows 201 to 206 of the vehicle as described in paragraph C described above.

The visual line guidance system 2600 includes a state acquisition unit 2601, a display unit 2602, an information retrieval unit 2603, an information generation unit 2604, and a control unit 2605. The visual line guidance system 2600 basically operates on the vehicle control system 100 depicted in FIG. 1. At least some of constituent elements of the visual line guidance system 2600 are implemented by using constituent elements included in the vehicle control system 100. Alternatively, some of the constituent elements of the visual line guidance system 2600 may be implemented by using an information terminal such as a smartphone and a tablet-type terminal carried into the vehicle interior by the person on board, or other types of information apparatuses. In addition, it is assumed that the respective constituent elements of the visual line guidance system 2600 are capable of achieving bidirectional data communication between each other via a bus or by using interprocess communication.

The state acquisition unit 2601 basically acquires information associated with a state of the vehicle, and may further acquire information associated with a state of a person on board having boarded the vehicle.

The state acquisition unit 2601 acquires a current position, a vehicle speed, and a steering angle of the vehicle as a state of the vehicle. These items of information correspond to information necessary for calculating an object of a scenery point entering the visual field range of each of the windshield 201 and the other windows 20 to 206, and an appearance position of the object in the windows 201 to 206. For example, the current position of the vehicle is acquirable on the basis of a GNSS signal received by the data acquisition unit 102 including a GNSS receiver. Further, the vehicle speed and the steering angle are acquirable from a detection result obtained by the vehicle state detection unit 143 on the basis of a rotation speed of the wheels and a steering angle of the steering wheel.

Further, the state acquisition unit 2601 acquires a level of autonomous driving of the autonomous driving control unit 112 as a state of the vehicle. As also apparent from FIGS. 21 to 25, visual line guidance is achieved by masking at least a part of the visual field range of each of the windows 201 to 206. During complete autonomous driving or high-level autonomous driving of the vehicle, safe traveling is achievable without any problems even if at least a part of the visual field of the windshield 201 or the like is lacking. On the other hand, after switching to low-level autonomous driving or manual driving, safe traveling may be put at risk if at least a part of the visual field of each of the windows 201 to 206 such as the windshield 201 is lacking.

In addition, the state acquisition unit 2601 performs personal authentication of each person on board using face authentication or biometric authentication as a state of each person on board, and acquires a boarding purpose, schedule information, and background information such as the gender, the age, hobbies, and histories of the identified person on board. The personal authentication may be performed on the basis of vehicle owner information. Further, the boarding purpose, the schedule information, and the background information associated with the person on board may be managed inside the vehicle by using a database, may be read from an information terminal such as a smartphone carried by the person on board, or may be acquired from the outside of the vehicle by using V2X communication or the like. The object of the visual line guidance or the order of priority of the objects may be switched according to the boarding purpose, the schedule information, and the background information associated with the person on board. For example, the visual line should be actively guided to scenery points if boarding is made for a traveling purpose. However, the level of the necessity of visual line guidance decreases if boarding is made for a commuting purpose. Further, the visual line need not be repeatedly or frequently guided to an identical or similar scenery point. Further, the tendency of scenery points desired to be viewed differs for each hobby, history, or the like of the person on board.

In addition, the state acquisition unit 2601 may acquire a physical condition, a degree of alertness, a degree of concentration, a degree of fatigue, and the like of the person on board on the basis of a detection result obtained by the interior information detection unit 142. It may be unpreferable to perform visual line guidance applied to the windows 201 to 206 by a scenery masking process when the person on board feels sick or feels tired.

The display unit 2602 includes a liquid crystal shutter attached to at least a part of the windows 201 to 206 of the vehicle. The liquid crystal shutter is a device capable of switching between a transmissive state and a non-transmissive state or gradually or successively switching transmittance in units of grid having a predetermined size, and drives in a frame period of approximately 30 fps (frame per second) or 60 fps, for example. For example, a scenery masking process for bringing only a partial region of the windshield 201 into a transmissive state is performed by operating the liquid crystal shutter. In this manner, a desired object is visually highlighted to guide the visual line of the person on board to this object.

Further, the display unit 2602 is capable of displaying guidance information by using a non-transmissive region arranged on the windows 201 to 206 such as the windshield 201. The guidance information is character-based information, but may include figures or images. The display unit 2602 may draw the guidance information by driving the liquid crystal shutter, or may project the guidance information in the non-transmissive region by using a projector or a head-up display additionally equipped.

The information retrieval unit 2603 retrieves information associated with an object of a scenery point to which the visual line is to be guided. The information retrieval unit 2603 refers to map information and scenery information to achieve this information retrieval. At least a part of the map information and the scenery information used by the information retrieval unit 2603 may be accumulated in a storage device included in the vehicle control system 100 or equipped in the vehicle, such as the storage unit 111. Alternatively, the information retrieval unit 2603 may access the map information and the scenery information accumulated in a system outside the vehicle via V2X communication.

The information retrieval unit 2603 searches for a scenery point to which the visual line is guided, on the basis of position information. Specifically, after acquiring position information associated with respective scenery points from the map information and the scenery information, the information retrieval unit 2603 extracts things likely to enter the visual field range of the person on board through the windows 201 to 206 such as the windshield 201 as targets of visual line guidance, on the basis of a result of comparison between a current position and a traveling direction of the vehicle and the position information associated with the scenery points.

Further, the information retrieval unit 2603 may select (filter) the scenery points extracted on the basis of the position information by performing a matching process for matching information associated with the person on board and the respective scenery points. This selection is made because a mere comparison with the position information could leave a large number of scenery points remaining as candidates. For example, the information retrieval unit 2603 calculates a score of each scenery point by performing the matching process using a method such as CF and CBF, on the basis of a boarding purpose, schedule information, and background information associated with the person on board and acquired by the state acquisition unit 2601, and selects a predetermined number of scenery points each having a high score as targets of visual line guidance, or gives priority to each scenery point in a descending order of the score.

The information generation unit 2604 generates guidance information associated with the object of the scenery point found by the information retrieval unit 2603. The guidance information is displayed by the display unit 2602 by using the non-transmissive region arranged for the scenery masking process in the windows 201 to 206 such as the windshield 201 as described above. Examples of the guidance information include simple information simply indicating the name of the object, information associated with an access to the object, such as a distance and a required length of time, information associated with use of the object such as an entrance fee, a usage fee, and a congestion situation, and information describing a historical trail and a view of the object. The information generation unit 2603 generates guidance information associated with the object, on the basis of scenery information accumulated in the storage unit 111, and scenery information accessible using V2X communication. Further, the information generation unit 2604 generates plural pieces of guidance information associated with one object in some cases.

The guidance information generated by the information generation unit 2604 is displayed by the display unit 2602 using the non-transmissive region arranged in the windows 201 to 206 such as the windshield 201. In a case where the information generation unit 2604 generates plural pieces of guidance information associated with one object, display of the plural pieces of guidance information is sequentially switched according to traveling processes of the vehicle, the distance between the vehicle and the object, or the like. For example, in a stage where the object is viewed in a small size from the vehicle still located away from the scenery point, or in a stage of notice of appearance of the object invisible behind another thing, simple guidance information indicating the name of the target is simply displayed. Thereafter, with approach to the object, display is gradually switched to guidance information including information associated with an access to the object, such as a distance and a required length of time, more detailed guidance information including information associated with use of the object, such as a congestion situation, and information describing a history and a view of the object.

The control unit 2605 controls overall operations of the respective units within the visual line guidance system 2600.

For example, the control unit 2605 controls a filtering process for filtering a plurality of scenery points searched for by the information retrieval unit 2603.

Further, the control unit 2605 controls a scenery masking process, i.e., a process performed by the display unit 2602 for achieving optimum arrangement of the transmissive region and the non-transmissive region within the windows 201 to 206, on the basis of an appearance position of an object of an object of a scenery point on the windows 201 to 206 such as the windshield 201, for example. Specifically, the position, the size, the shape, and the like of the transmissive region are determined such that a desired object is visible in a highlighted manner in a state where a scenery is masked by the non-transmissive region set in the windshield 201 or the like.

Further, the control unit 2605 controls a generation process performed by the information generation unit 2604 for generating guidance information according to selection of an object of a scenery point and selection switching.

E. Process Operation of Visual Line Guidance System

Figure 27:
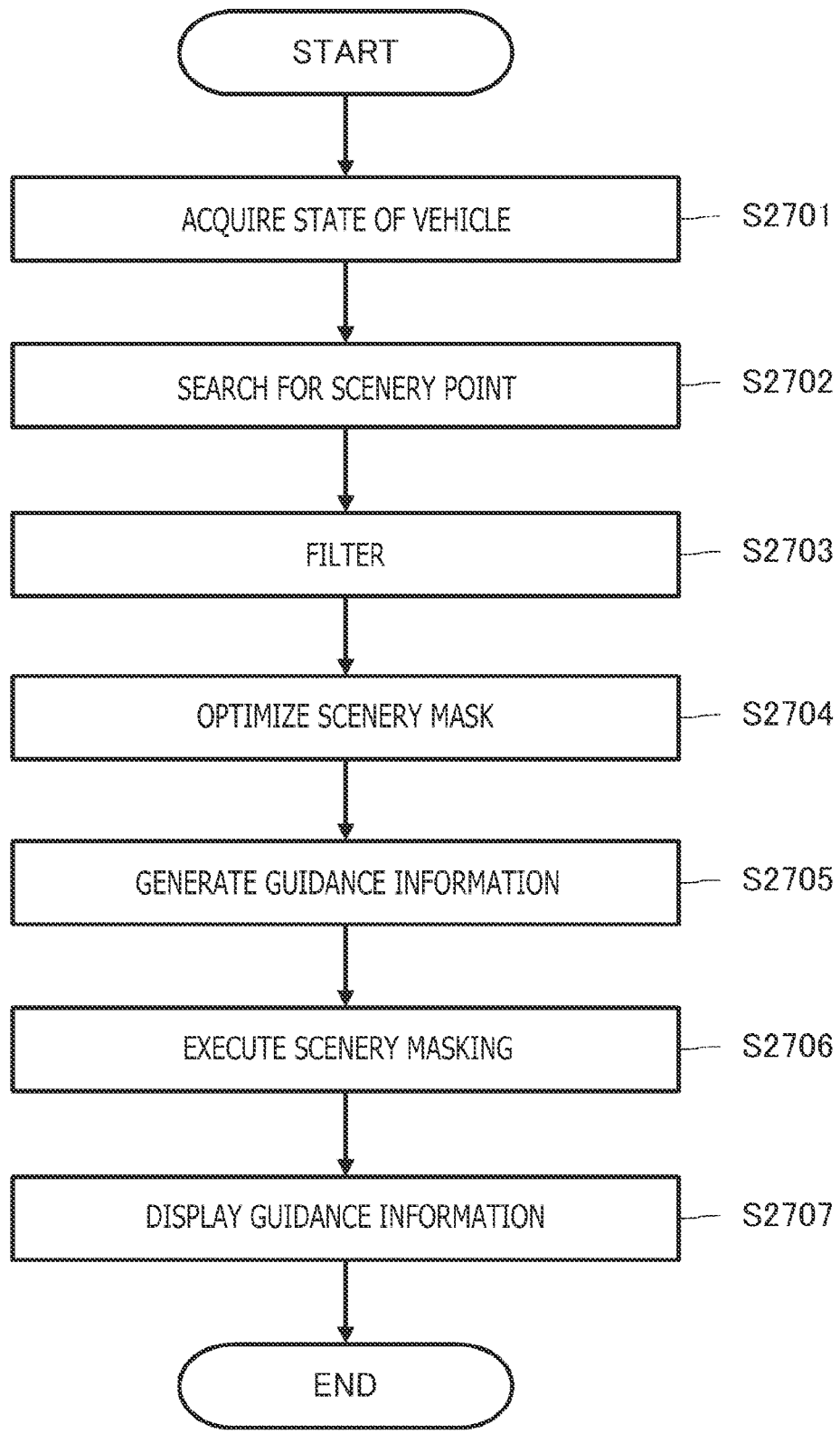
FIG. 27 is a flowchart presenting a processing procedure for performing visual line guidance.

Described in this paragraph is an operation example of the visual line guidance system 2600 described in paragraph D. FIG. 27 presents a processing procedure in the form of a flowchart, performed by the visual line guidance system 2600 for achieving visual line guidance.

Initially, the state acquisition unit 2601 acquires a current position, a vehicle speed, and a steering angle of the vehicle (step S2701).

In this processing step S2701, the state information acquisition unit 2601 may also acquire information associated with other states of the vehicle, such as an autonomous driving level of the vehicle, and information associated with the person having boarded the vehicle. The information associated with the person on board includes a boarding purpose, schedule information, and background information such as the gender, the age, hobbies, and histories of the person on board, for example.

Subsequently, the information retrieval unit 2603 retrieves information associated with an object of a scenery point to which the visual line is to be guided (step S2702). Specifically, after acquiring position information associated with the respective scenery points from map information and scenery information, the information retrieval unit 2603 detects things likely to enter the visual field range of the person on board through the windows 201 to 206 such as the windshield 201, and extracts these things as targets of visual line guidance on the basis of a result of comparison between a current position and a traveling direction of the vehicle and position information associated with the scenery points.

Thereafter, the information retrieval unit 2603 performs a filtering process for a search result obtained in previous step S2702 (step S2703).

In this processing step S2703, for example, the information retrieval unit 2603 calculates a score of each scenery point by performing the matching process using a method such as CF and CBF, on the basis of a boarding purpose, schedule information, and background information associated with the person on board and acquired by the state acquisition unit 2601, and selects a predetermined number of scenery points each having a high score as targets of visual line guidance, or gives priority to each scenery point in a descending order of the score. For example, in a case where plural scenery points simultaneously appear in the windshield 201, the number of the scenery points to which visual line guidance is applied is reduced to a predetermined number or smaller (e.g., one) on the basis of the order of priority.

Further, in this processing step S2703, the filtering process may be performed on the basis of a state of the person on board. For example, the filtering process is performed on the basis of a boarding purpose, the number of times of visual line guidance performed for the objects before, the interval from previous visual line guidance, the latest state of the person on board (including a physical condition and a temper). If boarding is made for a commuting purpose or the like, frequent execution of visual line guidance is troublesome. In this case, the filtering process may be performed in such a manner as to reduce the number of times of execution. Further, if a scenery point is famous but viewed by the person on board many times before, the degree of necessity of visual line guidance is low. Accordingly, this scenery point may be filtered. Further, it may be unpreferable to perform visual line guidance applied to the windows 201 to 206 by a scenery masking process when the person on board feels sick or feels tired. In this case, the filtering process is performed on the basis of a physical condition, a degree of alertness, a degree of concentration, a degree of fatigue, or the like of the person on board.

Thereafter, the control unit 2605 performs a scenery mask optimization process (step S2704). In this processing step 2604, display positions of the transmissive region and the non-transmissive region are determined according to an appearance position of the object of the scenery point to which the visual line is guided within the windshield 201 (or the other windows 20 to 206). Further, the shape of the transmissive region is determined according to the contour or the like of the object of the scenery point, and the size of the transmissive region is determined such that an area of a portion where the object is visible becomes a predetermined ratio or smaller.

Further, the information generation unit 2604 generates guidance information associated with the object of the scenery point to which the visual line is determined to be guided after the filtering process (step S2705). The information generation unit 2604 may generate plural pieces of guidance information associated with one object. Examples of the guidance information include simple information simply indicating the name of the object, guidance information associated with an access to the object, such as a distance and a required length of time, guidance information associated with use of the object such as an entrance fee, a usage fee, and a congestion situation, and guidance information describing a historical trail and a view of the object.

Thereafter, the control unit 2605 controls the display unit 2602 in such a manner that the transmissive region and the non-transmissive region located at the positions and having the shapes each determined in step S2704 are displayed on the windows 201 to 206 such as the windshield 201, and execute scenery masking is executed (step S2706).

However, the non-transmissive region displayed on the windshield 201 blocks a part of the visual field range of the driver. Accordingly, the control unit 2605 may determine whether to execute visual line guidance and actually display the non-transmissive region depending on whether or not the vehicle is in an autonomous driving state. During complete autonomous driving or high-level autonomous driving of the vehicle, safe traveling is achievable without any problems even if at least a part of the visual field of the windshield 201 or the like is lacking. On the other hand, after switching to low-level autonomous driving or manual driving, safe traveling may be put at risk if at least a part of the visual field of each of the windows 201 to 206 such as the windshield 201 is lacking. During low-level autonomous driving or manual driving, the control unit 2605 may prohibit display of the non-transmissive region on the windows 201 to 206 such as the windshield 201, or may prohibit a start of visual line guidance processing itself.

Further, the control unit 2605 controls the display unit 2602 in such a manner that the guidance information generated in step S2705 is displayed using the non-transmissive region displayed in step S2706 (step S2707).

In a case where the information generation unit 2604 generates plural pieces of guidance information associated with one object, display of the plural pieces of guidance information is sequentially switched according to traveling processes of the vehicle, the distance between the vehicle and the object, and the like in this processing step S2707. For example, in a stage where the object is viewed in a small size from the vehicle still located away from the scenery point, or in a stage of notice of appearance of the object invisible behind another thing, simple guidance information indicating the name of the object is simply displayed. Thereafter, with approach to the object, display is gradually switched to guidance information including information associated with an access to the object, such as a distance and a required length of time, more detailed guidance information including information associated with use of the object, such as a congestion situation, and information describing a history and a view of the object.

During execution of visual line guidance, the visual line guidance system 2600 repetitively starts the processing procedure presented in FIG. 27 for each predetermined cycle. Every time this processing procedure is executed, the scenery mask and display of the guidance information applied to the windows 201 to 206 such as the windshield 201 are refreshed.

INDUSTRIAL APPLICABILITY

The technology disclosed in the present description has been described above in detail with reference to the specific embodiment. However, it is obvious that those skilled in the art can make corrections or substitutes of this embodiment without departing from the subject matters of the technology disclosed in the present description.

According to the present description, the embodiment where the technology disclosed in the present description is applied to scenery display on the vehicle traveling on the road has been chiefly described. However, the subject matters of the technology disclosed in the present description are not limited to this example. The technology disclosed in the present description is also applicable to scenery display on a window of a railroad vehicle, an airplane, or a vessel, or on a window of other various types of mobile bodies or the like boarded by a human.

Further, according to the present description, the embodiment where the visual line of the person on board is guided using the window of the vehicle has been chiefly described. However, the technology disclosed in the present description may be practiced using other devices. For example, the technology disclosed in the present description can similarly be practiced using an in-house video display device such as a car navigation screen or a tablet terminal carried by a person on board.

In short, the technology disclosed in the present description has been described by presenting only an example. It is therefore not intended that contents described in the present description should be interpreted in a limited manner. The claims should be taken into consideration to determine the subject matters of the technology disclosed in the present description.

Note that the technology disclosed in the present description may also have the following configurations.

(1)

An information processing apparatus including:

a detection unit that detects a region where a predetermined object outside a mobile body appears within a window of the mobile body;

a display unit that displays a transmissive region and a non-transmissive region within the window; and a control unit that controls the display unit on the basis of a detection result obtained by the detection unit.

(2)

The information processing apparatus according to (1) described above, in which the control unit controls the display unit in such a manner that a transmissive region in the region where the object appears is displayed or a non-transmissive region that masks a region where the object is absent is displayed.

(3)

The information processing apparatus according to (1) or (2) described above, further including:

a state acquisition unit that acquires state information associated with the mobile body, in which the detection unit detects the object on the basis of the state information.

(4)

The information processing apparatus according to (3) described above, in which the state acquisition unit acquires position information associated with the mobile body, and the detection unit detects the object on the basis of a current position of the mobile body.

(5)

The information processing apparatus according to (3) described above, in which the state acquisition unit acquires a current position of the mobile body and a moving speed and a traveling direction of the mobile body, and the detection unit detects the region where the object appears in the window, on the basis of the current position of the mobile body, the moving speed and the traveling direction of the mobile body, and position information associated with the object.

(6)

The information processing apparatus according to any one of (1) to (5) described above, in which the control unit controls at least either a shape or a size of the transmissive region on the basis of at least either a size of the object appearing in the window or the region where the object appears.

(7)

The information processing apparatus according to any one of (1) to (6) described above, in which the display unit includes a liquid crystal shutter disposed on the window, and the control unit arranges the transmissive region and the non-transmissive region in the window by drive-controlling the liquid crystal shutter.

(8)

The information processing apparatus according to any one of (1) to (7) described above, further including:

a search unit that searches for the object.

(9)

The information processing apparatus according to (8) described above, in which the search unit searches for an object of a scenery point appearing within the window.

(10)

The information processing apparatus according to (9) described above, in which the search unit searches for the object on the basis of at least either map information or scenery information that describes information associated with the scenery point.

(11)

The information processing apparatus according to any one of (8) to (10) described above, in which the search unit further selects an object from plural found objects or gives priority to each of the found objects, and the control unit controls the display unit in such a manner that a non-transmissive region that masks a region where the selected object or the object to which higher priority has been given is absent is displayed.

(12)

The information processing apparatus according to (11) described above, in which the search unit selects or gives priority to the object on the basis of a result of matching between information associated with a person having boarded the mobile body and each of the objects.

(13)

The information processing apparatus according to any one of (1) to (12) described above, further including:

a state acquisition unit that acquires information associated with a person having boarded the mobile body, in which the control unit controls display of the non-transmissive region on the basis of the information associated with the person on board.

(14)

The information processing apparatus according to any one of (1) to (13) described above, further including:

a generation unit that generates guidance information associated with the object, in which the control unit controls the display unit in such a manner that the guidance information is displayed.

(15)

The information processing apparatus according to (14) described above, in which the control unit controls the display unit in such a manner that the guidance information is displayed in the non-transmissive region.

(16)

The information processing apparatus according to (14) or (15) described above, in which the generation unit generates plural pieces of guidance information for one object, and the control unit controls the display unit in such a manner that the plural pieces of guidance information are sequentially displayed.

(17)

The information processing apparatus according to (16) described above, in which the control unit switches display of the plural pieces of guidance information on the basis of relative positions of the mobile body and the object.

(18)

An information processing method including:

a detection step of detecting a region where a predetermined object outside a mobile body appears within a window of the mobile body;

a display step of causing a display unit to display a transmissive region and a non-transmissive region within the window; and a control step of controlling the display unit in such a manner that a transmissive region in the region where the object appears is displayed or a non-transmissive region that masks a region where the object is absent is displayed, on the basis of a detection result obtained by the detection step.

(19)

A mobile body apparatus including:

a main unit of a mobile body, the main unit including one or more windows;

a detection unit that detects a region where a predetermined object outside the mobile body appears within the window;

a display unit that displays a transmissive region and a non-transmissive region within the window; and a control unit that controls the display unit on the basis of a detection result obtained by the detection unit, in which the control unit controls the display unit in such a manner that a transmissive region in the region where the object appears is displayed or a non-transmissive region that masks a region where the object is absent is displayed.

REFERENCE SIGNS LIST

100: Vehicle control system
101: Input unit
102: Data acquisition unit
103: Communication unit
104: In-vehicle apparatus
105: Output control unit
106: Output unit
107: Drive control unit
108: Drive system
109: Body control unit
110: Body system
111: Storage unit
112: Autonomous driving control unit
121: Communication network
131: Detection unit
132: Self-position estimation unit
133: Situation analysis unit
134: Planning unit
135: Action control unit
141: Exterior information detection unit
142: Interior information detection unit
143: Vehicle state detection unit
151: Map analysis unit
152: Traffic rule recognition unit
153: Situation recognition unit
154: Situation prediction unit
161: Route planning unit
162: Behavior planning unit
163: Action planning unit
171: Emergency avoidance unit
172: Acceleration and deceleration control unit
173: Direction control unit
2600: Visual line guidance system
2601: State acquisition unit
2602: Display unit
2603: Information retrieval unit
2604: Information generation unit
2605: Control unit

The invention claimed is:

1. An apparatus, comprising:
a GNSS (Global Navigation Satellite System) receiver configured to receive a plurality of GNSS signals from a plurality of GNSS satellites;
at least one sensor configured to detect, by using the received plurality of GNSS signals, each of:
a current position of a mobile body, and
a traveling direction of the mobile body, wherein the apparatus is associated with the mobile body;
a detection unit configured to determine, based on each of the detected current position and the detected traveling direction, an appearance position of a first object on a window of the mobile body, wherein
the first object is outside of the mobile body, and
the first object appears within the window of the mobile body; and
a control unit configured to:
control, based on the determined appearance position, a masking process to set each of a first display position of a transmissive region and a second display position of a non-transmissive region within the window, wherein
the transmissive region is in a first region of the window where the first object appears,
the non-transmissive region is in a second region of the window where the first object is absent, and the non-transmissive region masks the second region where the first object is absent;
determine a change in the appearance position of the first object on the window; and
dynamically control, based on the change in the appearance position of the first object on the window, the masking process to change:
the set first display position of the transmissive region to a third display position of the transmissive region within the window, and
the set second display position of the non-transmissive region to a fourth display position of the non-transmissive region within the window.

2. The apparatus according to claim 1, further comprising a state acquisition unit configured to acquire state information associated with the mobile body, wherein the detection unit is further configured to determine the appearance position of the first object based on the state information.

3. The apparatus according to claim 2, wherein
the state acquisition unit is further configured to acquire a moving speed of the mobile body, and
the detection unit is further configured to determine the change in the appearance position of the first object based on each of:
the detected current position of the mobile body,
the acquired moving speed of the mobile body,
the detected traveling direction of the mobile body, and
position information associated with the first object.

4. The apparatus according to claim 1, wherein the control unit is further configured to control at least one of a shape of the transmissive region or a size of the transmissive region based on at least one of:
a size of the first object that appears in the window, or
the first region where the first object appears.

5. The apparatus according to claim 1, wherein
the control unit is further configured to control a liquid crystal shutter to arrange each of:
the transmissive region in the first region of the window based on one of the first display position or the third display position, and
the non-transmissive region in the second region of the window based on one of the second display position or the fourth display position, and
the liquid crystal shutter is on the window.

6. The apparatus according to claim 1, further comprising an information retrieval unit configured to search for the first object.

7. The apparatus according to claim 6, wherein
the information retrieval unit is further configured to search for the first object of a scenery point, and
the scenery point appears within the window.

8. The apparatus according to claim 7, wherein
the information retrieval unit is further configured to search for the first object based on at least one of map information or scenery information, and
the at least one of the map information or the scenery information describes information associated with the scenery point.

9. The apparatus according to claim 6, wherein
the information retrieval unit is further configured to:
extract a plurality of objects, wherein the plurality of objects includes the first object and a second object;
assign a priority to each object of the extracted plurality of objects; and
select the second object from the extracted plurality of objects,
the control unit is further configured to control the masking process such that the non-transmissive region masks a third region of the window where the selected second object is absent, and
the second object is assigned a higher priority than the first object.

10. The apparatus according to claim 9, wherein the information retrieval unit is further configured to:
execute a matching process to obtain a result of match between:
information associated with a person boarded on the mobile body, and
information associated with each object of the extracted plurality of objects; and
assign the priority to each object of the extracted plurality of objects based on the result of match.

11. The apparatus according to claim 1, further comprising a state acquisition unit configured to acquire information associated with a person boarded on the mobile body, wherein the control unit is further configured to control display of the non-transmissive region based on the information associated with the person.

12. The apparatus according to claim 1, further comprising a generation unit configured to generate guidance information associated with the first object, wherein the control unit is further configured to control a display unit to display the guidance information.

13. The apparatus according to claim 12, wherein the control unit is further configured to control the display unit to display the guidance information in the non-transmissive region.

14. The apparatus according to claim 12, wherein
the generation unit is further configured to generate a plurality of pieces of guidance information for the first object, and
the control unit is further configured to control the display unit to sequentially display the plurality of pieces of guidance information.

15. The apparatus according to claim 14, wherein the control unit is further configured to sequentially switch the display of the plurality of pieces of guidance information based on relative positions of the mobile body and the first object.

16. An information processing method, comprising:
receiving, by a GNSS (Global Navigation Satellite System) receiver, a plurality of GNSS signals from a plurality of GNSS satellites;
detecting, by using the received plurality of GNSS signals, each of:
a current position of a mobile body, and
a traveling direction of the mobile body;
determining, based on each of the detected current position and the detected traveling direction, an appearance position of an object on a window of the mobile body, wherein
the object is outside of the mobile body, and
the object appears within the window of the mobile body; and
controlling, based on the determined appearance position, a masking process to set each of a first display position of a transmissive region and a second display position of a non-transmissive region within the window, wherein
the transmissive region is in a first region of the window where the object appears,
the non-transmissive region is in a second region of the window where the object is absent, and the non-transmissive region masks the second region where the object is absent;
determining a change in the appearance position of the object on the window; and
dynamically controlling, based on the change in the appearance position of the object on the window, the masking process to change:
the set first display position of the transmissive region to a third display position of the transmissive region within the window, and
the set second display position of the non-transmissive region to a fourth display position of the non-transmissive region within the window.

17. A mobile body apparatus, comprising:
a main unit of a mobile body, wherein
the mobile body apparatus is associated with the mobile body, and
the main unit includes at least one window;
a GNSS (Global Navigation Satellite System) receiver configured to receive a plurality of GNSS signals from a plurality of GNSS satellites;
at least one sensor configured to detect, by using the received plurality of GNSS signals, each of:
a current position of the mobile body, and
a traveling direction of the mobile body;
a detection unit configured to determine, based on each of the detected current position and the detected traveling direction, an appearance position of an object on the at least one window of the mobile body, wherein
the object is outside of the mobile body, and
the object appears within the at least one window; and
a control unit configured to:
control, based on the determined appearance position, a masking process to set each of a first display position of a transmissive region and a second display position of a non-transmissive region within the at least one window, wherein
the transmissive region is in a first region of the at least one window where the object appears,
the non-transmissive region is in a second region of the at least one window where the object is absent, and
the non-transmissive region masks the second region where the object is absent;
determine a change in the appearance position of the object on the at least one window; and
dynamically control, based on the change in the appearance position of the object on the at least one window, the masking process to change:
the set first display position of the transmissive region to a third display position of the transmissive region within the at least one window, and
the set second display position of the non-transmissive region to a fourth display position of the non-transmissive region within the at least one window.

18. The apparatus according to claim 1, wherein the apparatus corresponds to an in-vehicle apparatus that includes at least one of:
a mobile apparatus associated with a person inside the mobile body,
a wearable apparatus associated with the person, or
a navigation device.

19. A display system, comprising:
a GNSS (Global Navigation Satellite System) receiver configured to receive a plurality of GNSS signals from a plurality of GNSS satellites;
at least one sensor configured to detect, based on the received plurality of GNSS signals, each of:
a current position of a mobile body, and
a traveling direction of the mobile body, wherein the display system is associated with the mobile body;
a detection unit configured to determine, based on each of the detected current position and the detected traveling direction, an appearance position of an object on a window of the mobile body, wherein
the object is outside of the mobile body, and
the object appears within the window of the mobile body;
a control unit configured to:
control, based on the determined appearance position, a masking process to set each of a first display position of a transmissive region and a second display position of a non-transmissive region within the window, wherein
the transmissive region is in a first region of the window where the object appears,
the non-transmissive region is in a second region of the window where the object is absent, and
the non-transmissive region masks the second region where the object is absent;
determine a change in the appearance position of the object on the window; and
dynamically control, based on the change in the appearance position of the object on the window, the masking process to change:
the set first display position of the transmissive region to a third display position of the transmissive region within the window, and
the set second display position of the non-transmissive region to a fourth display position of the non-transmissive region within the window; and
a display unit configured to arrange each of:
the transmissive region within the window based on one of the first display position or the third display position, and
the non-transmissive region within the window based on one of the second display position or the fourth display position.

20. The apparatus according to claim 1, further comprising a state acquisition unit configured to acquire a state of the mobile body, wherein
the acquired state corresponds to one of an autonomous driving state of the mobile body, a semi-autonomous driving state of the mobile body, or a manual driving state of the mobile body, and
the control unit is further configured to control, based on the acquired state of the mobile body, a display unit to arrange each of the transmissive region and the non-transmissive region within the window.

* * * * *